(12) United States Patent
Jones

(10) Patent No.: US 11,275,548 B2
(45) Date of Patent: Mar. 15, 2022

(54) DISPLAY APPARATUS

(71) Applicant: Maria Francisca Jones, Middlesex (GB)

(72) Inventor: Maria Francisca Jones, Middlesex (GB)

( * ) Notice: Subject to any disclaimer, the term of this patent is extended or adjusted under 35 U.S.C. 154(b) by 0 days.

(21) Appl. No.: 16/957,691

(22) PCT Filed: Dec. 31, 2018

(86) PCT No.: PCT/GB2018/053779
§ 371 (c)(1),
(2) Date: Jun. 24, 2020

(87) PCT Pub. No.: WO2019/130025
PCT Pub. Date: Jul. 4, 2019

(65) Prior Publication Data
US 2020/0364020 A1   Nov. 19, 2020

(30) Foreign Application Priority Data
Dec. 29, 2017   (GB) ..................................... 1722249

(51) Int. Cl.
*G06F 3/041*   (2006.01)
*G06F 3/14*   (2006.01)
(Continued)

(52) U.S. Cl.
CPC .......... *G06F 3/1431* (2013.01); *G06F 1/1652* (2013.01); *G06F 3/041* (2013.01);
(Continued)

(58) Field of Classification Search
CPC ...... G06F 1/1632; G06F 1/1652; G06F 3/041; G06F 3/1431; G09G 2356/00;
(Continued)

(56) References Cited

U.S. PATENT DOCUMENTS

| | | |
|---|---|---|
| 8,823,640 B1 | 9/2014 | Harris |
| 2009/0273560 A1 | 11/2009 | Kalanithi et al. |

(Continued)

FOREIGN PATENT DOCUMENTS

| | | |
|---|---|---|
| EP | 2495941 A1 | 9/2012 |
| EP | 3392545 A1 | 10/2018 |

(Continued)

OTHER PUBLICATIONS

Great Britain Patent Application No. 1722249.8; Combine Search and Examination Report; dated Jul. 5, 2018; 10 pages.

(Continued)

*Primary Examiner* — Insa Sadio
(74) *Attorney, Agent, or Firm* — Feeney IP Law; Alan F. Feeney, Esq.

(57) ABSTRACT

Display apparatus comprises a plurality of display units each hingedly linked together to form a foldable display structure, each display unit comprising a display screen with user input capability, a battery, and a wireless transceiver; and a mount unit adapted to receive and hold the display units when folded within the mount unit, the mount unit further comprising a power arrangement configured to recharge the battery of the display units when the display units are received and held within the mount unit, a first wireless transceiver for communication with the wireless transceiver of each of the display units, and a communication arrangement for communication over a communications network, wherein the display units are removeable from within the mount unit for use separated from the mount unit.

8 Claims, 36 Drawing Sheets

(51) Int. Cl.
*G06F 1/16* (2006.01)
*G09G 5/12* (2006.01)
*H02J 7/00* (2006.01)
*H02J 7/02* (2016.01)

(52) U.S. Cl.
CPC .............. *G09G 5/12* (2013.01); *H02J 7/0013* (2013.01); *H02J 7/0044* (2013.01); *G09G 2356/00* (2013.01); *G09G 2370/16* (2013.01); *G09G 2380/02* (2013.01); *H02J 7/02* (2013.01)

(58) Field of Classification Search
CPC .. G09G 2370/16; G09G 2380/02; G09G 5/12; H02J 7/0013; H02J 7/0027; H02J 7/0044; H02J 7/02; H02J 7/025
See application file for complete search history.

(56) References Cited

U.S. PATENT DOCUMENTS

| | | |
|---|---|---|
| 2012/0050135 A1 | 3/2012 | Glen et al. |
| 2012/0326972 A1 | 12/2012 | Koenig |
| 2013/0271417 A1* | 10/2013 | Nagao ................... G06F 1/1643 345/173 |
| 2013/0297844 A1 | 11/2013 | Rosenberg et al. |
| 2014/0002327 A1 | 1/2014 | Toren et al. |
| 2014/0065956 A1 | 3/2014 | Yang et al. |
| 2014/0085815 A1* | 3/2014 | Filipovic ................. G06F 1/163 361/679.56 |
| 2014/0232615 A1 | 8/2014 | Acosta et al. |
| 2014/0302780 A1 | 10/2014 | Mao |
| 2014/0315489 A1 | 10/2014 | Lee |
| 2014/0347264 A1 | 11/2014 | Lee et al. |
| 2015/0035474 A1 | 2/2015 | Yang et al. |
| 2016/0283084 A1 | 9/2016 | Keysers et al. |
| 2016/0352118 A1 | 12/2016 | Huang |
| 2017/0336826 A1 | 11/2017 | Rolus Borgward |

FOREIGN PATENT DOCUMENTS

| | | |
|---|---|---|
| GB | 2545490 A | 6/2017 |
| JP | 2008-309950 A | 12/2008 |
| WO | WO 2012/047213 A1 | 4/2012 |
| WO | WO 2012/165283 A1 | 12/2012 |
| WO | WO 2014/029174 A1 | 2/2014 |
| WO | WO 2017/091201 A1 | 6/2017 |
| WO | WO 2017/192231 A1 | 11/2017 |

OTHER PUBLICATIONS

Great Britain Patent Application No. 1722249.8; Search Report; dated Aug. 5, 2019; 3 pages.

International Patent Application No. PCT/GB2018/053779; Int'l Written Opinion and Search Report; dated Jul. 1, 2019; 19 pages.

* cited by examiner

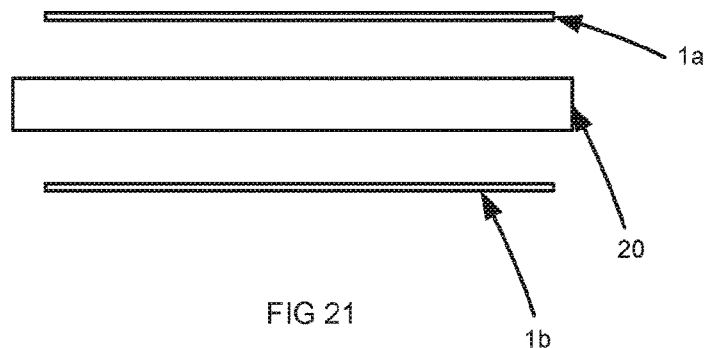
FIG 21
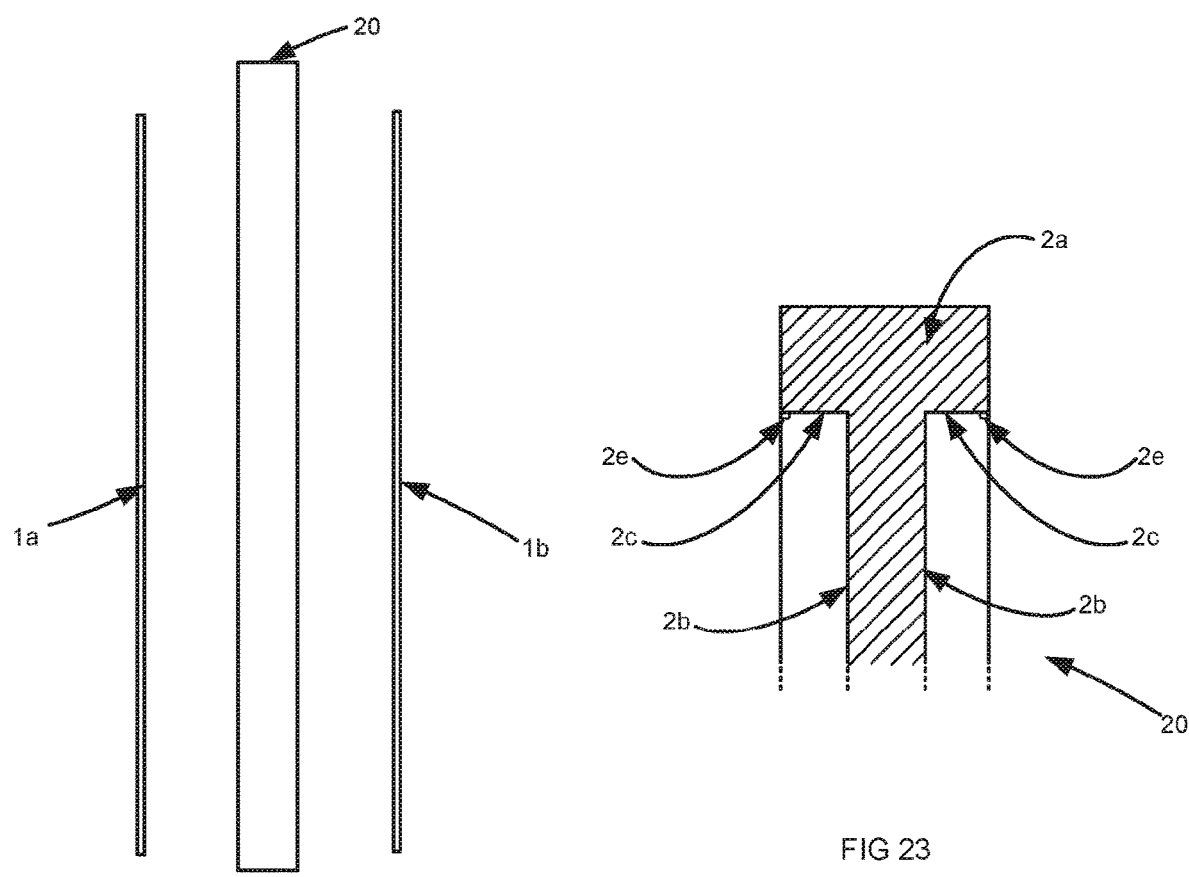
FIG 22
FIG 23

DISPLAY APPARATUS

CROSS-REFERENCE TO RELATED APPLICATIONS

This application is a 371 National Stage Application of International Patent Application No. PCT/GB2018/053779 filed Dec. 31, 2018, which claims priority to United Kingdom Patent Application No. 1722249.8 filed Dec. 29, 2017, the entire contents of which are incorporated by reference herein.

FIELD OF THE INVENTION

The present invention relates to display apparatus.

BACKGROUND INFORMATION

Display apparatuses are used in a wide range of devices, such as portable devices, such as mobile telephones and tablet computer devices. The challenges for the designers of portable devices is to design a display apparatus that is light, battery efficient and convenient to use.

SUMMARY OF THE INVENTION

The present invention provides display apparatus comprising a plurality of display units each hingedly linked together to form a foldable display structure, each display unit comprising a display screen with user input capability, a battery, and a wireless transceiver; and a mount unit adapted to receive and hold the display units when folded within the mount unit, the mount unit further comprising a power arrangement configured to recharge the battery of the display units when the display units are received and held within the mount unit, a first wireless transceiver for communication with the wireless transceiver of each of the display units, and a communication arrangement for communication over a communications network; wherein the display units are removeable from within the mount unit for use separated from the mount unit.

The present invention also provides a display apparatus comprising at least one display unit, the or each display unit comprising a display screen with user input capability, a battery, and a wireless transceiver; a display frame structure for receiving and supporting at least peripheral portions of the or each display unit; and a mount unit adapted to receive and hold the display frame structure within the mount unit, the mount unit further comprising a power arrangement configured to recharge the battery of the or each display unit when the or each display unit is received within the mount unit, a first wireless transceiver for communication with the wireless transceiver of the or each display unit, and a communication arrangement for communication over a communications network; wherein the or each display unit is removeable from the mount unit for use separated from the mount unit.

The present invention also provides a display apparatus comprising a plurality of display units, each display unit comprising a display screen with user input capability, a battery, and a wireless transceiver; and a mount unit comprising a display frame structure for receiving and supporting at least peripheral portions of each of the display units, the mount unit further comprising a power arrangement configured to recharge the battery of the display units when the display units are received by the mount unit, a first wireless transceiver for communication with the wireless transceiver of the display units, and a communication arrangement for communication over a communications network; wherein the display units are removeable from the mount unit for use separated from the mount unit.

The present invention also provides a display apparatus comprising a plurality of display units, each display unit comprising a display screen with user input capability, a battery, and a wireless transceiver; and a mount unit comprising a hinge region and a plurality of frames hingedly connected to the hinge region, each frame configured to receive and hold a display unit, the mount unit further comprising a power arrangement configured to recharge the battery of the display units when the display units are received by the mount unit, a first wireless transceiver for communication with the wireless transceiver of the display units, and a communication arrangement for communication over a communications network; wherein the display units are removeable from the mount unit for use separated from the mount unit.

The present invention also provides a display apparatus comprising at least one display unit, the or each display unit comprising a display screen with user input capability, a battery, and a wireless transceiver; and a mount unit to receive and hold the or each display unit contained within the mount unit, the mount unit further comprising a power arrangement configured to recharge the battery of the or each display unit when the at least one display unit is received and held contained within the mount unit, a first wireless transceiver for communication with the wireless transceiver of each of the at least one display unit, and a communication arrangement for communication over a communications network; wherein the at least one display unit is removeable from within the mount unit for use separated from the mount unit.

The present invention also provides a display apparatus comprising a plurality of display units, each display unit comprising a detector arrangement to detect when at least one other display is arranged adjacently, a wireless transceiver to communicate display synchronization information to at least one adjacent display unit, and a display controller configured to control the display unit to display information comprising a sequence of information parts so that adjacent display units display information parts as a sequence of information parts.

The present invention also provides a display unit comprising a first display on a first face; a second display on a second face; a detection arrangement to detect when the display unit is turned to change the first display or the second display to face upwards; and a display controller to control the first and second display to display on one of the first or second displays a first information part of a sequence of information parts when the first display or second display is facing upwards, and to display on the other of the first and second displays a second information part incremented or decremented relative to the first information part in response to a detection by the detection arrangement.

BRIEF DESCRIPTION OF THE DRAWINGS

FIGS. 21 and 22 are side views of the example display apparatus of FIGS. 19 and 20 with the display units detached;

FIG. 23 is a sectional diagram of a part of the mount unit of the display apparatus of FIGS. 19 to 22;

DETAILED DESCRIPTION

Figure 1:
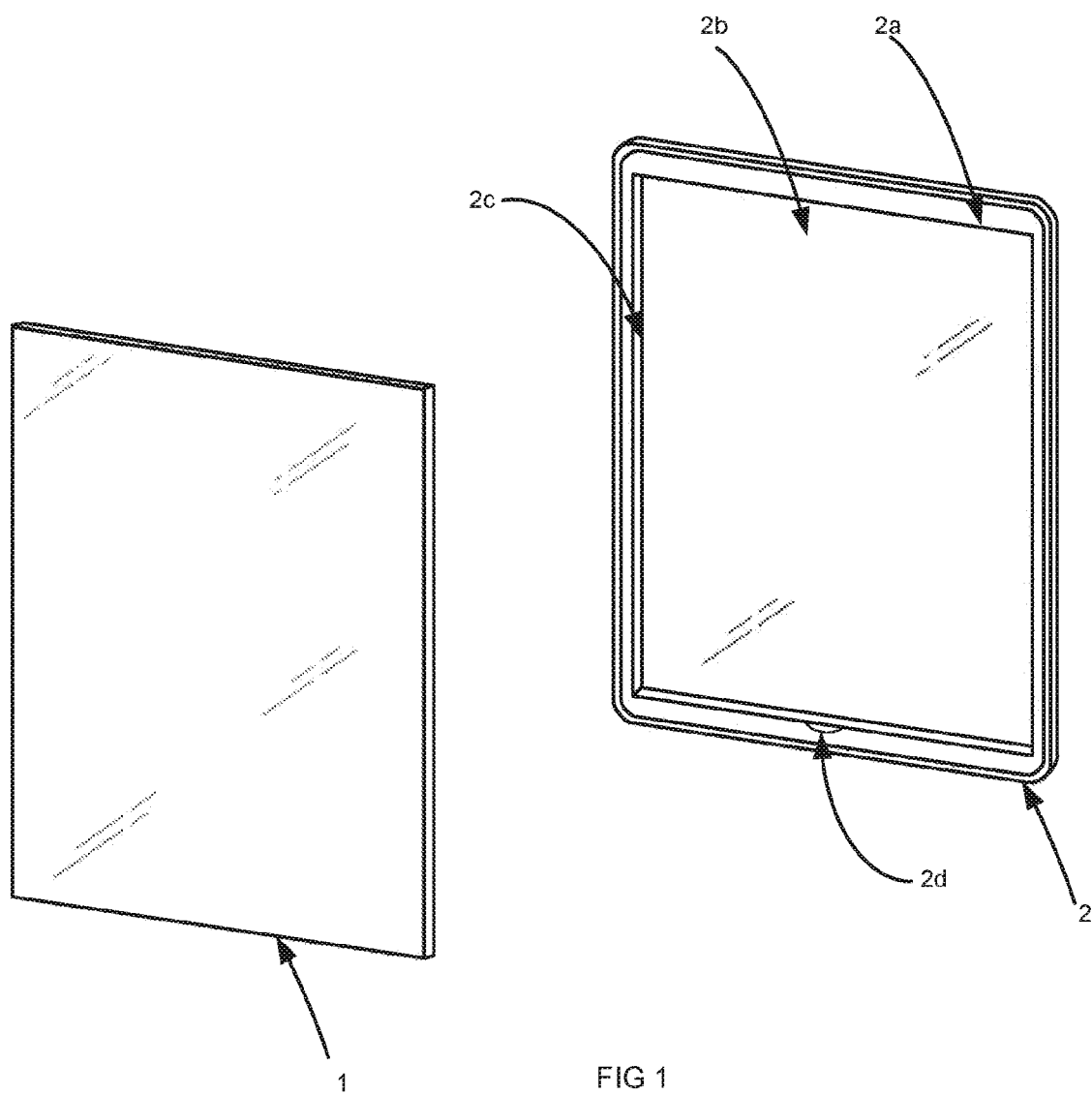
FIG. 1 is a schematic diagram illustrating an example display apparatus.
Figure 2:
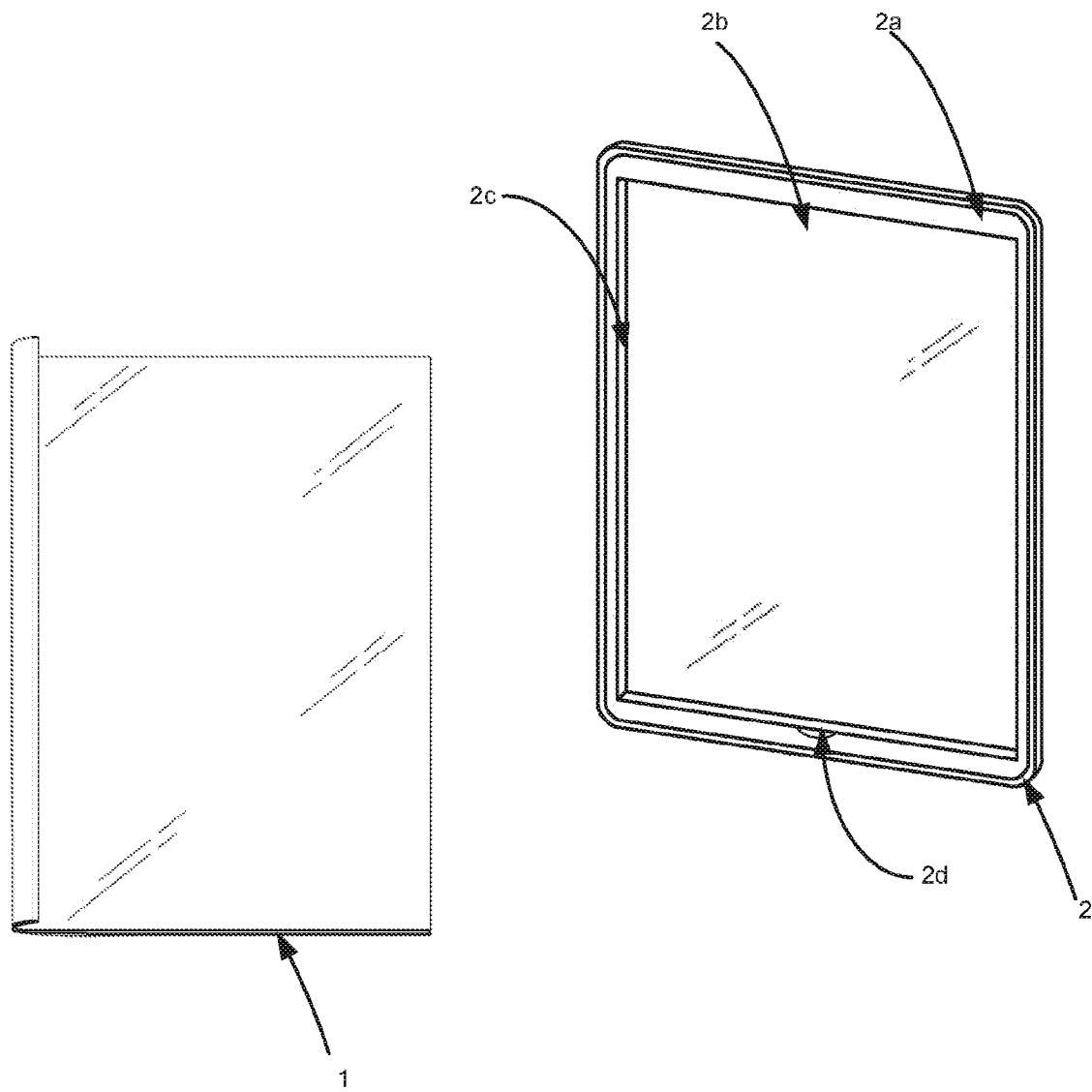
FIG. 2 is a schematic diagram illustrating an example display apparatus with a flexible display unit shown partly folded along a vertical direction.
Figure 3:
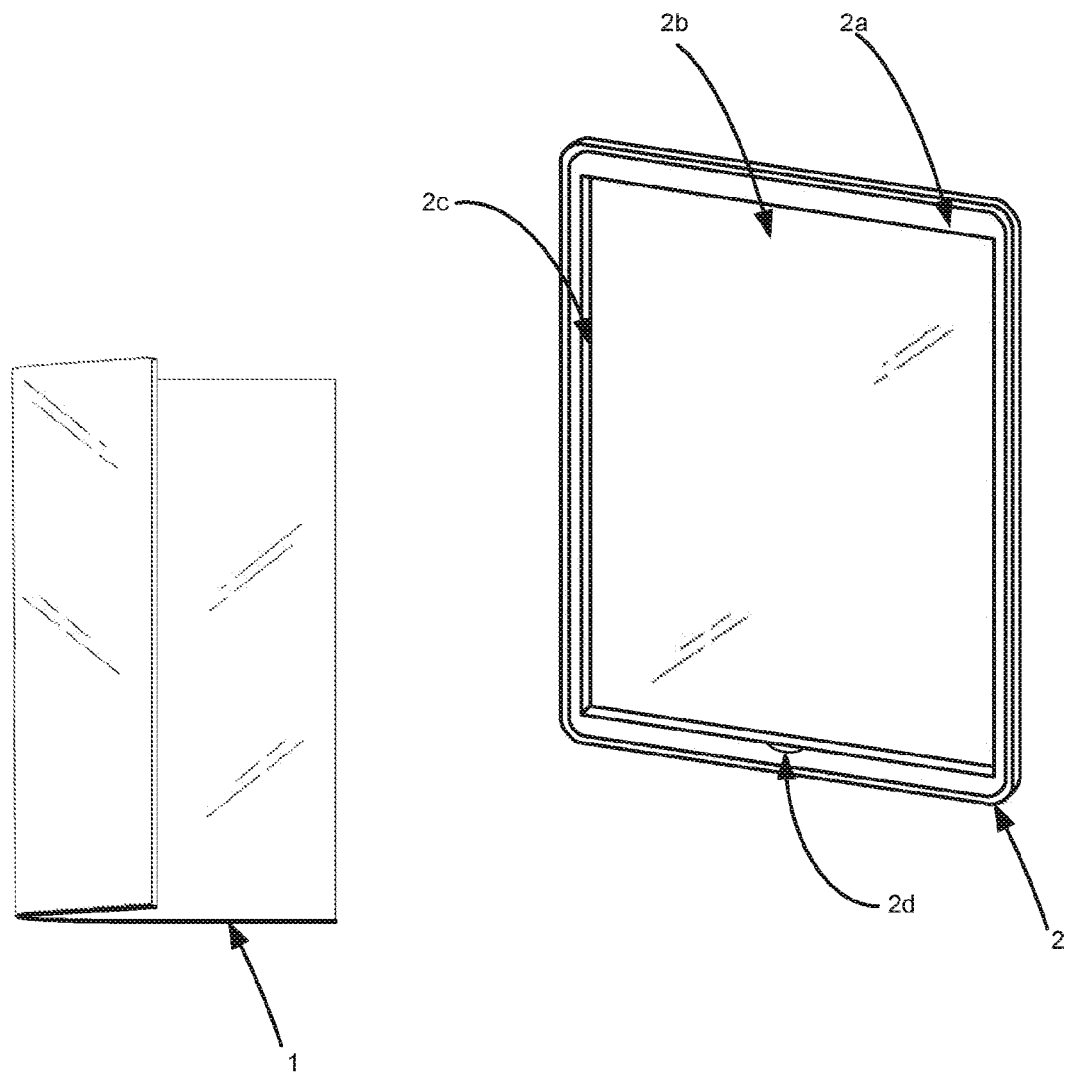
FIG. 3 is a schematic diagram illustrating the example display apparatus of FIG. 2 with the flexible display unit further folded.
Figure 4:
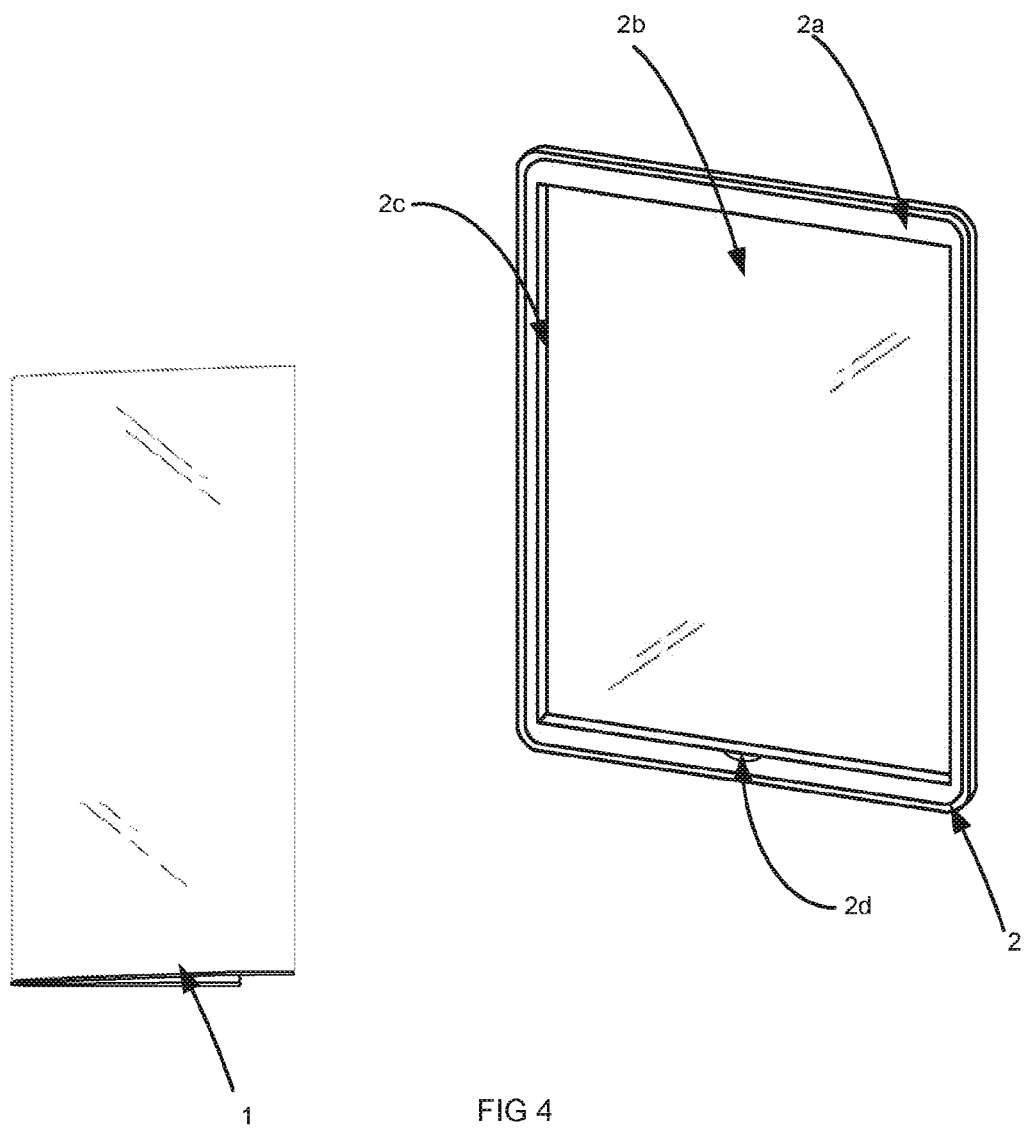
FIG. 4 is a schematic diagram illustrating the example display apparatus of FIG. 3 with the flexible display unit further folded.
Figure 5:
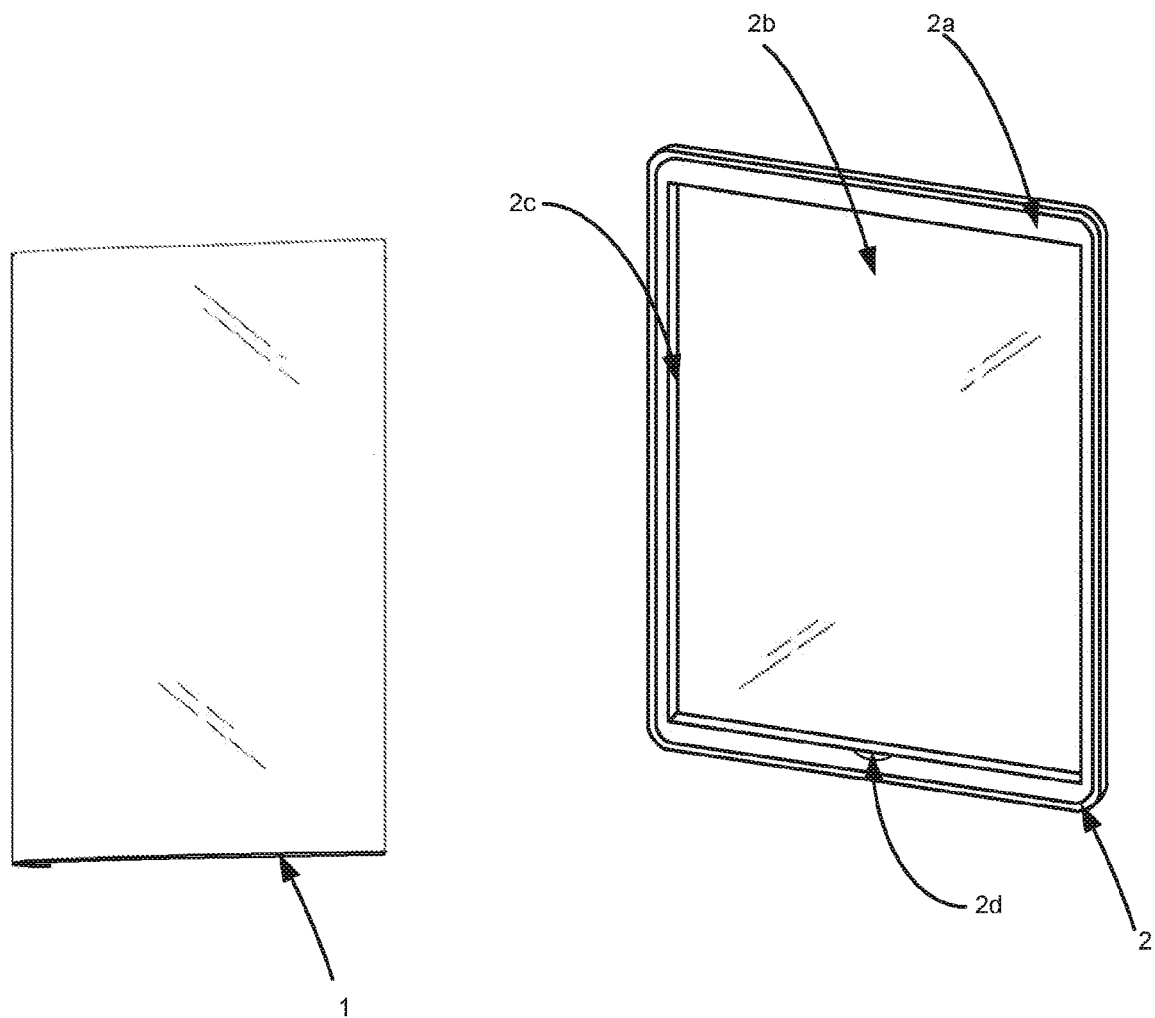
FIG. 5 is a schematic diagram illustrating the example display apparatus of FIG. 4 with the flexible display unit further folded.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

In the following embodiments, like components are labelled with like reference numerals.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

A generalized embodiment provides a display apparatus comprising at least one display unit, the or each display unit comprising a display screen with user input capability, a battery, and a wireless transceiver; and a mount unit adapted to receive and hold the at least one display unit.

The invention is suited to portable display apparatus but is not limited to such.

In one example, the mount is part of a non-portable apparatus such as a desktop computer or a machine control apparatus, whereby the one or more displays can be removed from the mount for use or used while still in or attached to the mount. For example, the mount could be fixed to or part of a machine, such as a Computer Numerically Controlled (CNC) machine and the or each display could be removeable for use in the control of the machine.

In a fixed configuration the communication arrangement of the mount unit can be wireless or wired to provide communications to a communications network. The communications network could be remote or part of apparatus to which the mount unit is fixed i.e. the internet, a WAN or a LAN. In a fixed configuration an apparatus can have more than one mount fixed thereto or incorporated therein.

In one example, the mount unit may be portable, hand held or fixed. The communication arrangement of the mount unit can comprise a second wireless transceiver for wireless communication, and the first wireless transceiver of the mount unit and the wireless transceiver of the or each display unit can be of a shorter range than the second wireless transceiver.

Having the mount unit portable or hand held has the advantage that the display apparatus can be used in a portable or hand-held manner when the one or more display units are mounted in the mount unit. When the display apparatus is portable, or hand held, the display apparatus can be carried by a user and when the user wishes to separately use a display unit, the mount unit can be set aside, so that the user can use just one or more display units, which are of smaller size and lighter than the whole display apparatus.

The use of a low power/short range wireless transceiver in the or each display unit and the mount unit requires the or each display unit to be within range of the mount unit for communication with the mount unit. The low power/short range communication protocol employed could be Bluetooth™. The or each display unit can be paired with the mount unit using the Bluetooth protocol for secure communications therebetween. The higher power/range communication wireless communication protocol used by the higher power/longer range transceiver of the mount unit could be WIFI, WiMAX, CDMA, GSM, GPRS, wireless local loop or WAN. Hence, the or each display unit can communicate with the mount unit and can also communicate with a communications network such as the internet, via the mount unit using the low power/short range communication link and the higher power/range communication link. In this way, the power requirements and the weight of the or each display unit is reduced.

The mount unit, in addition to acting as the proxy or hub for communications between a communications network and the or each display unit, provides physical support to house the or each display unit and provides the means by which the battery in the or each display unit is recharged while the or each display unit is mounted in or on the mount unit. The recharging of the battery can in the or each display unit can be by contacts or a contactless arrangement, such as an inductive charging arrangement. To provide the required power in a portable mount unit, the mount unit can itself include a battery to store the power necessary to enable the recharging of the battery of the one or more display units. The battery of the mount unit can be recharged using a charging adapter when connection to a mains power supply is available.

In any of the previously described embodiments, the transceiver of the or each display unit may use a higher power/longer range communication wireless communication protocol, such as WIFI, WiMAX, CDMA, GSM, GPRS, wireless local loop or WAN.

In one embodiment, a portable display apparatus having a mount and one or more removable display units, provides a user with a portable or handheld device that can be carried and used as a unit, when at least one of the display units is usable while held in the mount unit, or it can be used by separating the one or more display units from the mount unit to enable the use of the one or more display units separately from the mount unit. The mount unit can be put aside and for example stored in the user's handbag, laptop bag or rucksack, while the user uses the one or more display units. This reduces the bulk of the apparatus that the user is required to hold. Also, if multiple display units are separated from the mount unit, the display area and flexibility available to the user is greater than that which would be available from a conventional display apparatus.

In one example, the complexity and processing power of the or each display unit can be reduced, thereby saving battery and processing requirements and hence reducing weight and cost, by handing of some of the processing requirement to a processor housed in the mount unit. In this way the processor of the display unit and the processor of the mount unit cooperate or share the processing to process information for display by a display unit. Information for processing and the processed information as well as the commands for the coordinated processing can be exchanged between the display unit and the mount unit using the low powered and short range communication protocol e.g. Bluetooth™.

The or each display unit may be a rigid display or a flexible display or for a plurality of display units, a mix of flexible and rigid display units. The flexible display can be a flexible LCD or OLED display for example. If a display unit is flexible, the mount unit can provide a rigid or semi rigid support platform for housing the display unit when not in use. Also, if the display screen is visible while the display unit is mounted on the mount unit e.g. by mounting the display unit on one side of the mount unit, the mount unit can provide a rigid support for the flexible display unit in use. A flexible display unit can house major electronic components, such as a processor, memory, graphics driver, and Bluetooth™ transceiver along one edge of the display screen so that the display unit is flexible in regional of the display screen away from the edge e.g. the flexible display unit can be rolled or folded towards the edge housing the electronic components.

In one example, the mount unit can also be flexible, but to a lesser degree that one or more display units mounted in or to the mount unit.

The display screen can in one example comprise a touch sensitive display to provide not just for the output of information but also for user input. In an alternative embodiment, a camera can be provided in the display unit to provide for user input by gesture recognition. The display unit can also enable peripheral input device connection, e.g. a keyboard or pointer device, by low power/short range communications, such as using Bluetooth™.

In one example a plurality of display units can be hingedly linked together to provide a foldable display structure. The display units can be detachable for separate use. To receive and hold the display units, the display units are folded, and the folded configuration enabled the display units to be mounted to the mount unit.

In one example, a display frame structure is provided to receive and support at least peripheral portions of one or more display units. The display units in the display frame structure can then be mounted to the mount unit. In one example, the display frame structure receives and supports a plurality of display units and comprises a frame for each display unit. The frames are hingedly linked together to form a foldable frame structure. The frames can be detachable linked together to allow separation of the frames. This allows a display unit to be used in a frame. The frames provide support for the display units. This is particularly applicable for flexible display units.

The mount unit can hold the or each display unit in a number of different ways. The mount unit can hold the displays on one or more faces. Also, or in another example, the mount unit can hold the or each display unit internally, whereby the or each display unit is inserted into the mount unit through one or more slots, or by opening a lid or door of a casing of the mount.

In one example, the mount unit comprises a hinge region and a plurality of frames hingedly connected to the hinge region. Each frame is configured to receive and hold a display unit or two display units, one on their side.

In one example the mount unit includes an adjustable mounting arrangement for the mounting of one or more display units, wherein the adjustable mounting arrangement is adjustable to fit different sized display units therein.

In one example, the display unit can comprise a detector arrangement to detect when at least one other display is arranged adjacent in a side by side configuration, a wireless transceiver to communicate display synchronization information to at least one adjacent display unit, and a display controller to control the display output so that adjacent display units display information in a coordinated manner.

When display units are used side by side, the information displayed by the display units can be coordinated mutually to display the information as a sequence of information parts. In other words, as consecutive information from an information source, e.g. consecutive pages of text or images.

When adjacent display units are repositioned relative to one another, the display controller is configured to control the display output to display an information part so that adjacent display units display the information as an incremented sequence of information parts. In other words, if a display unit is moved in a manner equivalent to turning a page of a book, the displayed information is updated to reflect this and to increment the displayed pages.

The display units can include any convenient method to detect adjacency, such as optical detection, magnetic coupling e.g. a Hall switch, physical contact, or RF communication. In one example, the RF communication can comprise near field communication between adjacent display devices.

The display units providing this enhances cooperative information display capability can be used with the mount unit in the configurations as discussed above.

The or each display unit can be provided with a protective screen.

The mount unit can, in addition to mounting the or each display unit, in one example, the mount unit can include one or more built-in displays that is not removable.

The or each display unit can operate as a light weight low powered and flexible a tablet computer device that can access the internet or any computer network (local or wise area) via the mount unit.

Specific embodiments will now be described with reference to the drawings.

FIG. 1 illustrates display apparatus and shows a display unit 1 separate from a mount unit 2. In this example, the display unit 1 comprises a generally rectangular thin rigid or flexible display device for processing and displaying information. The mount unit 2 comprises a generally rectangular body containing electronics, as will be discussed hereinafter with reference to FIG. 36. The mount unit 2 is of larger dimensions than the display unit 1 and has a peripheral edge 2a surrounding a recessed face 2b having dimensions slightly larger than the dimensions of the display unit 1. A recess edge 2c is art right angles to the recessed face 2b and has a depth greater than a depth of the display unit 1 so that the display unit 1 can be received into the recess against the recess face 2b.

To retain the display unit in the recess, the recess edge can be provided with a resilient arrangement to grip the edges of the display unit. To enable the release or separation of the display unit 1 from the mount unit 2, a depression region 2d is provided in the peripheral region 2a to enable a user to prize the display unit 1 away from the mount unit 1.

FIGS. 2 to 5 illustrate an example of a display apparatus like that of FIG. 1, in which the display unit 1 is a flexible display unit. FIGS. 1 to 5 illustrate the flexible display unit 1 in various degrees of folding along a vertical axis. In this example, electronics can be housed in a vertical edge portion of the display unit 1 to allow the remainder of the display unit 1 to fold.

Figure 6:
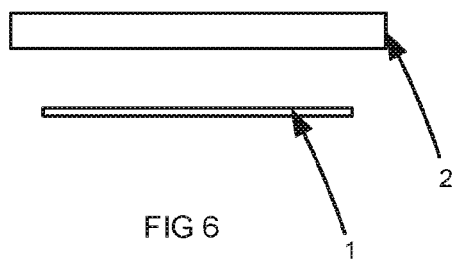
FIGS. 6 and 7 are side views of the example display apparatus of FIGS. 1 to 5.
Figure 7:
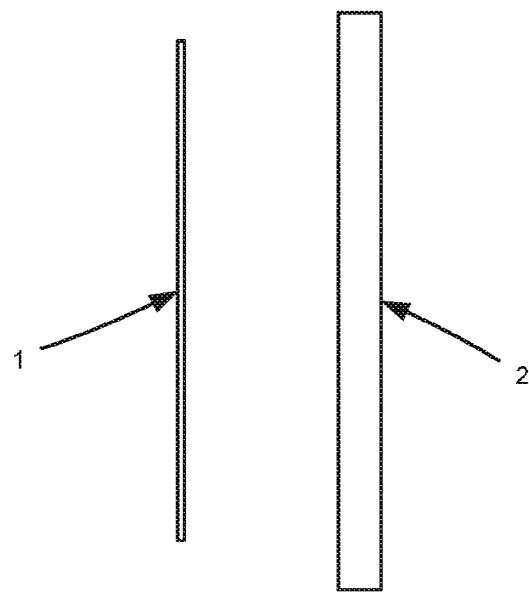

FIGS. 6 and 7 illustrate side views of the display apparatus of FIGS. 1 to 5 showing the separation of the display unit 1 and the mount unit 2.

Figure 8:
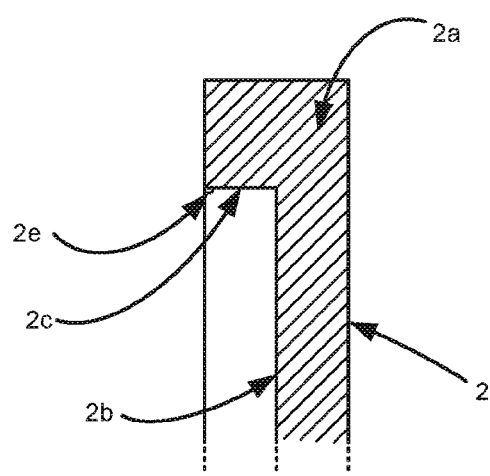
FIG. 8 is a sectional diagram of a part of the mount unit of the display apparatus of FIGS. 1 to 5.

FIG. 8 is a sectional view through the peripheral edge 2a of the mount unit 2. This view shows a resilient arrangement 2e to engage with the edge of the display unit 1 to hold the display unit 1 in the recess of the mount unit 2.

Figure 9:
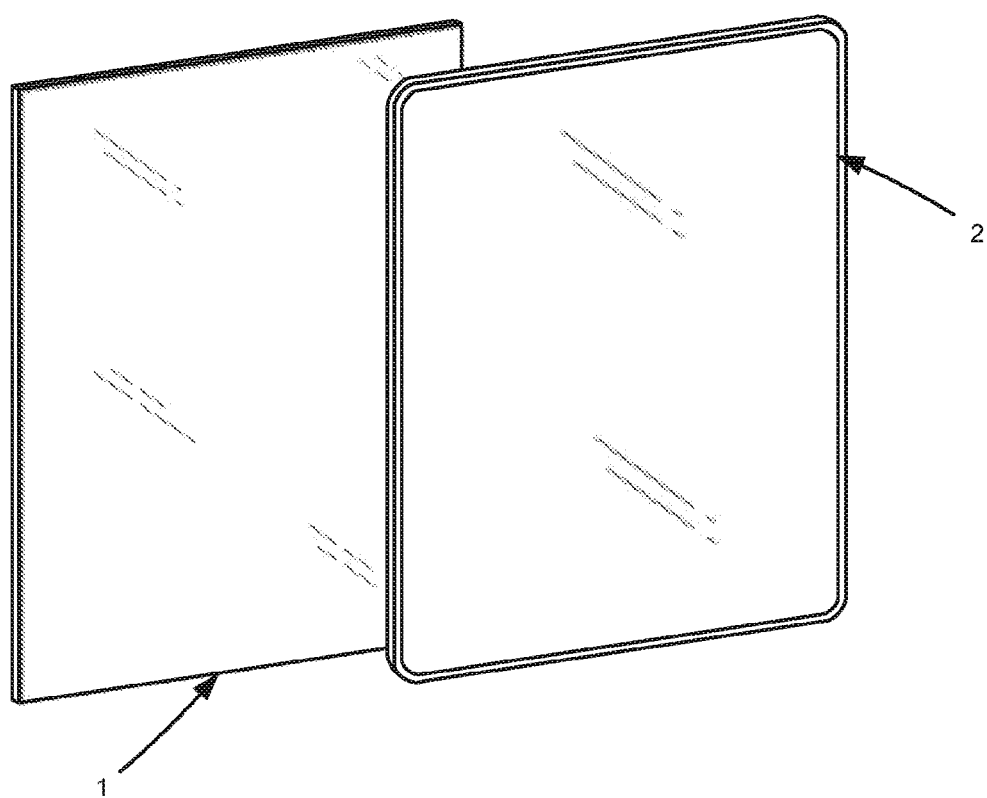
FIG. 9 is a schematic diagram illustrating the rear view of the example display apparatus of FIGS. 1 to 5.

FIG. 9 illustrates a rear view of the display apparatus showing the mount unit 2 and the display unit 1 separated.

Figure 10:
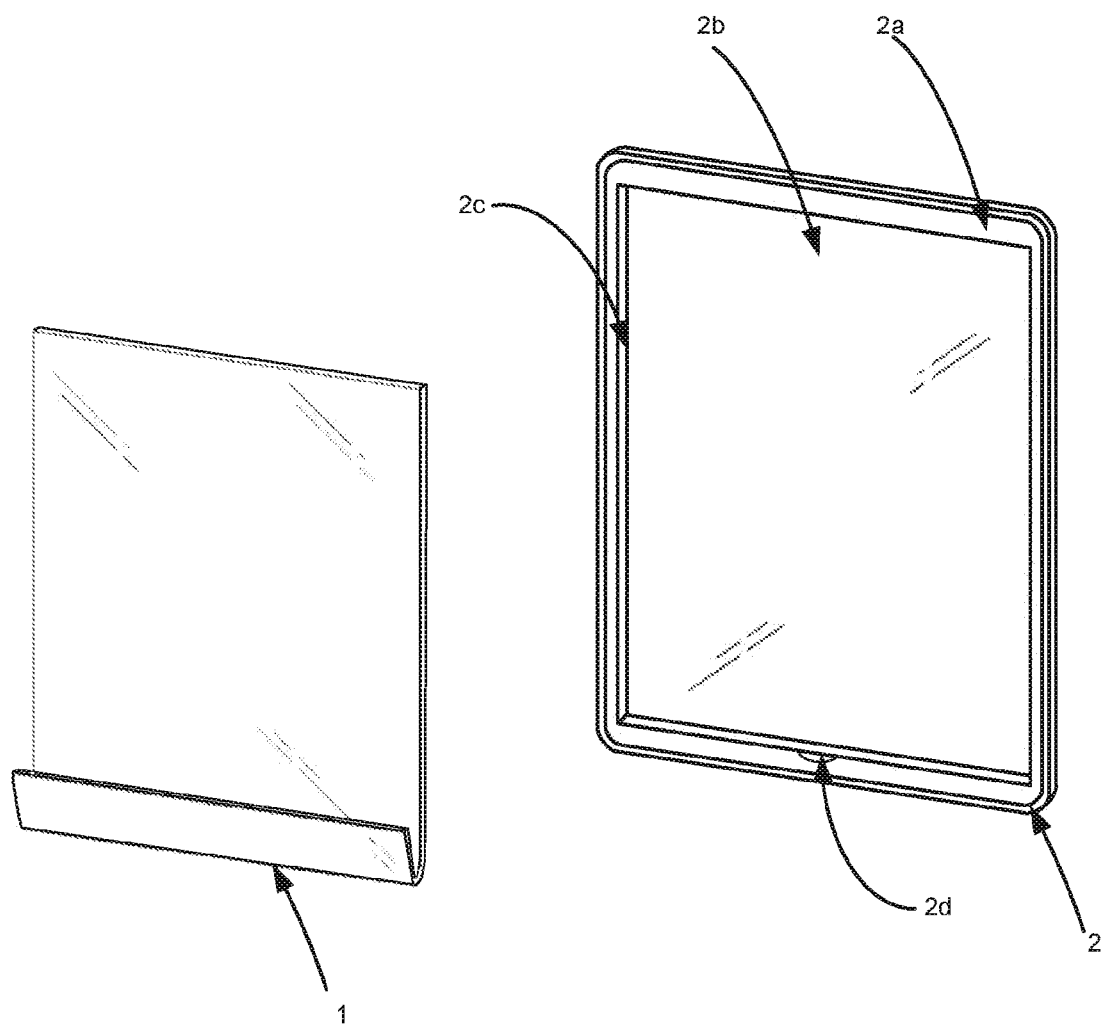
FIG. 10 is a schematic diagram illustrating an example display apparatus with a flexible display unit shown partly folded along a horizontal direction.
Figure 11:
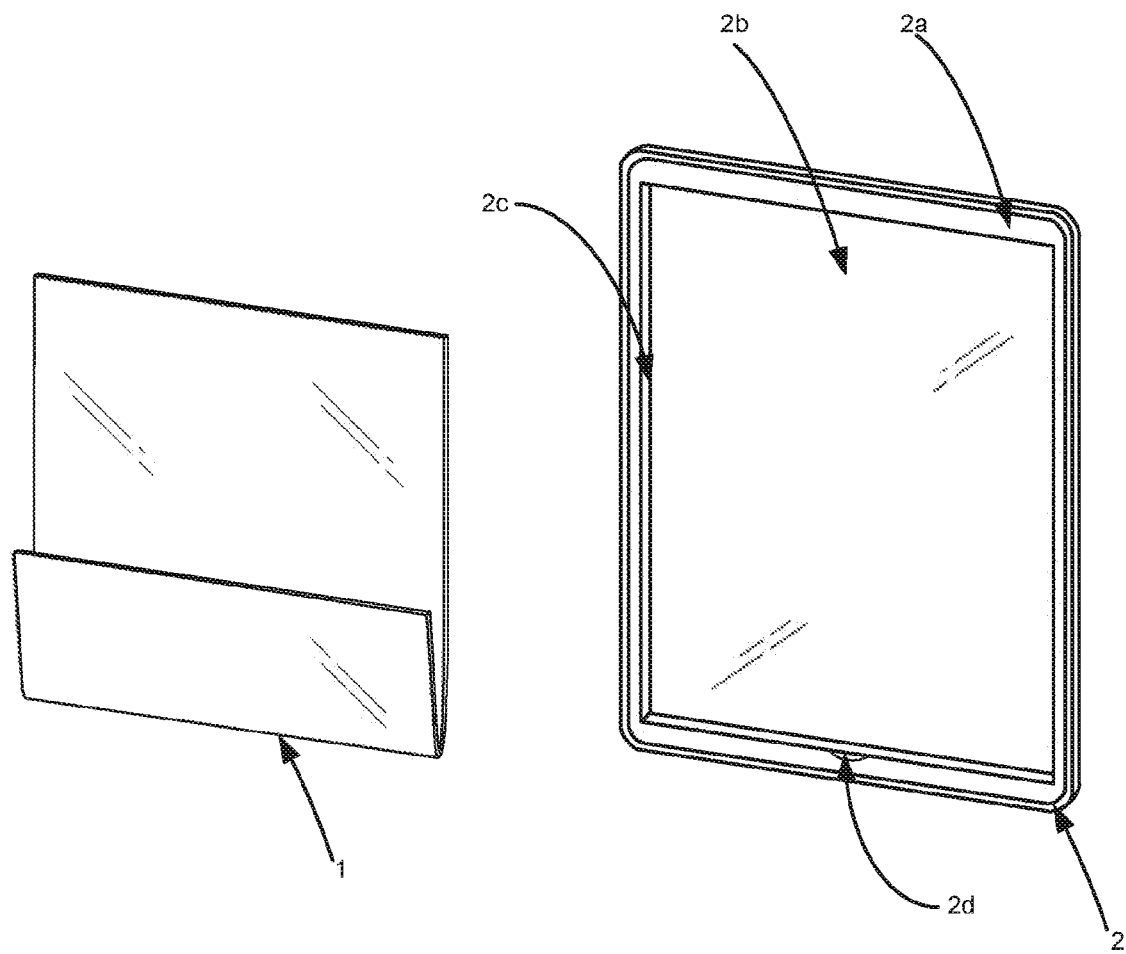
FIG. 11 is a schematic diagram illustrating the example display apparatus of FIG. 10 with the flexible display unit further folded.
Figure 12:
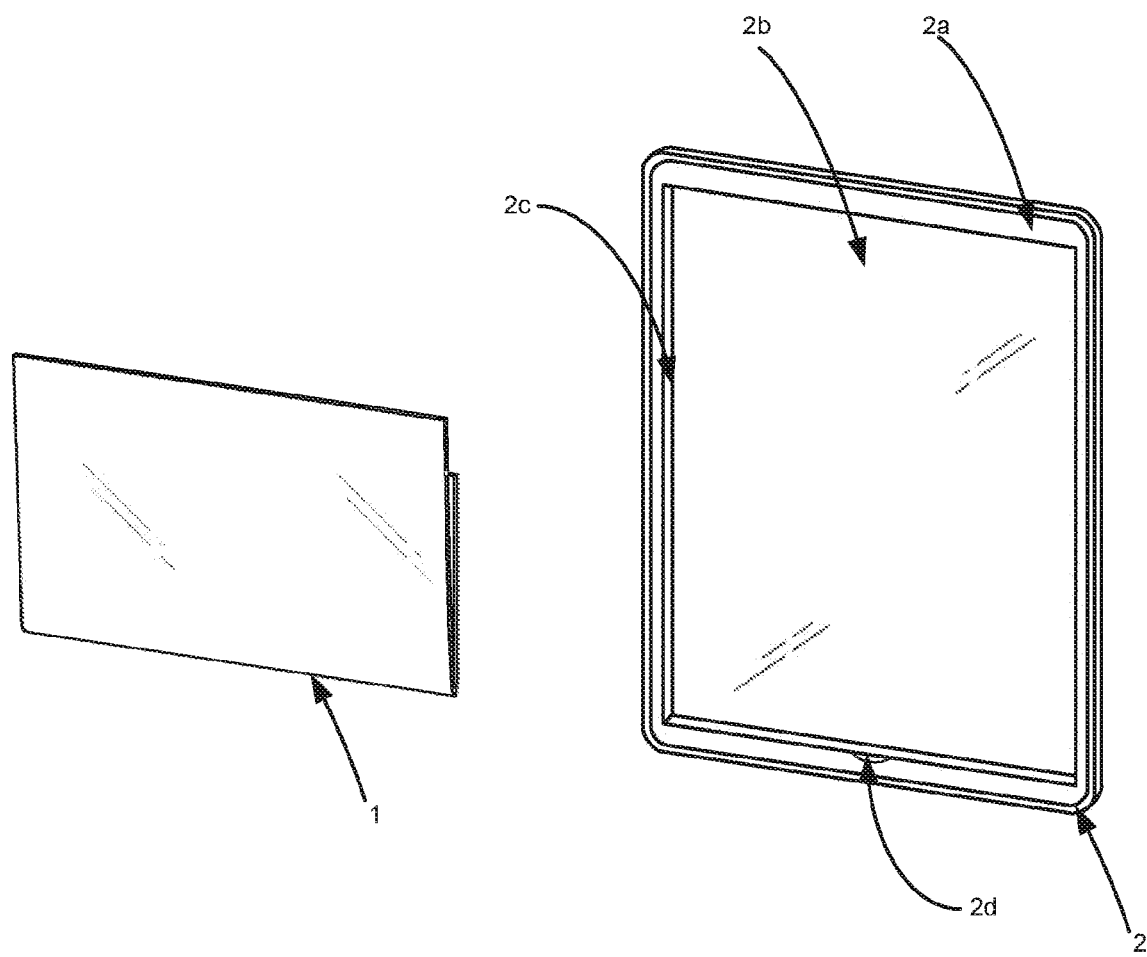
FIG. 12 is a schematic diagram illustrating the example display apparatus of FIG. 11 with the flexible display unit further folded.

FIGS. 10 to 12 illustrate an example of a display apparatus like that of FIG. 1, in which the display unit 1 is a flexible display unit. FIGS. 10 to 12 illustrate the flexible display unit 1 in various degrees of folding along a horizontal axis. In this example, electronics can be housed in a horizontal edge portion of the display unit 1 to allow the remainder of the display unit 1 to fold.

Figure 13:
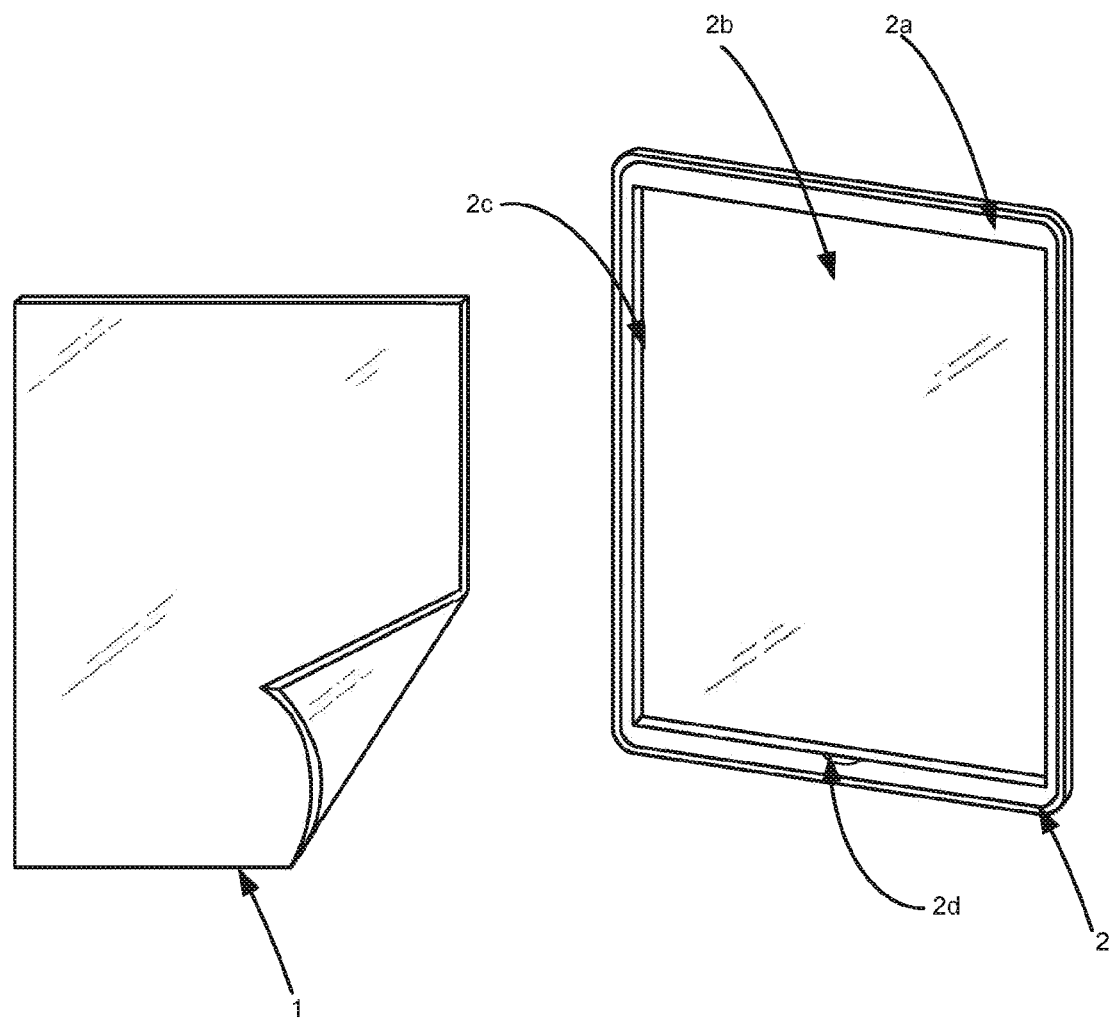
FIG. 13 is a schematic diagram illustrating an example display apparatus with a flexible display unit shown partly folded along a diagonal direction.

FIG. 13 illustrates an example of a display apparatus like that of FIG. 1, in which the display unit 1 is a flexible display unit that can fold along a diagonal axis.

In the examples of FIGS. 1 to 13, the display unit 1 mounted in the mount unit 2 is accessible to be used by the user even when the display unit 1 is mounted in the mount unit 2. Hence, in the mounted configuration, the display apparatus is still usable by the user.

Figure 14:
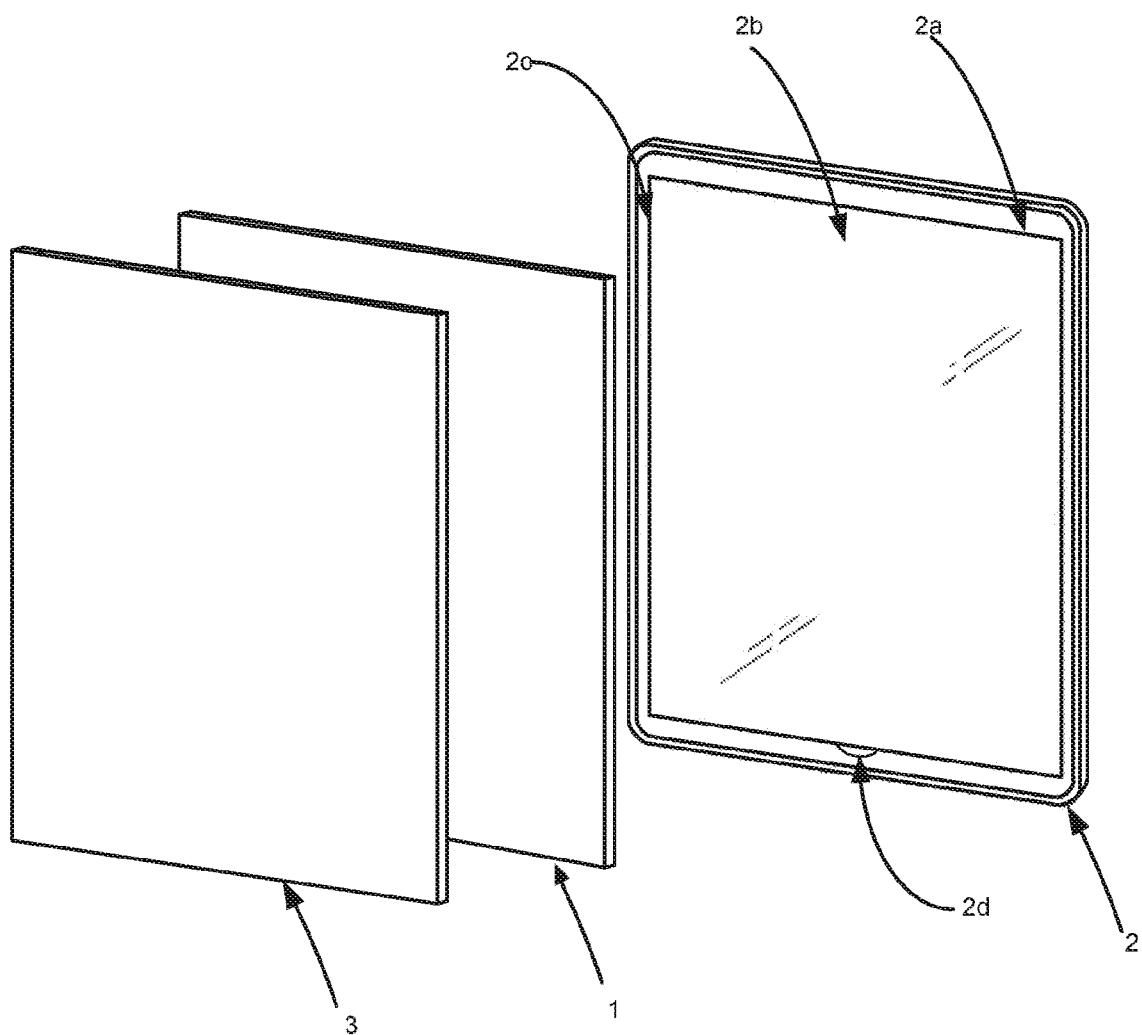
FIG. 14 is a schematic diagram illustrating an example display apparatus with the display unit fitted into the mount unit and with a protective cover.
Figure 15:
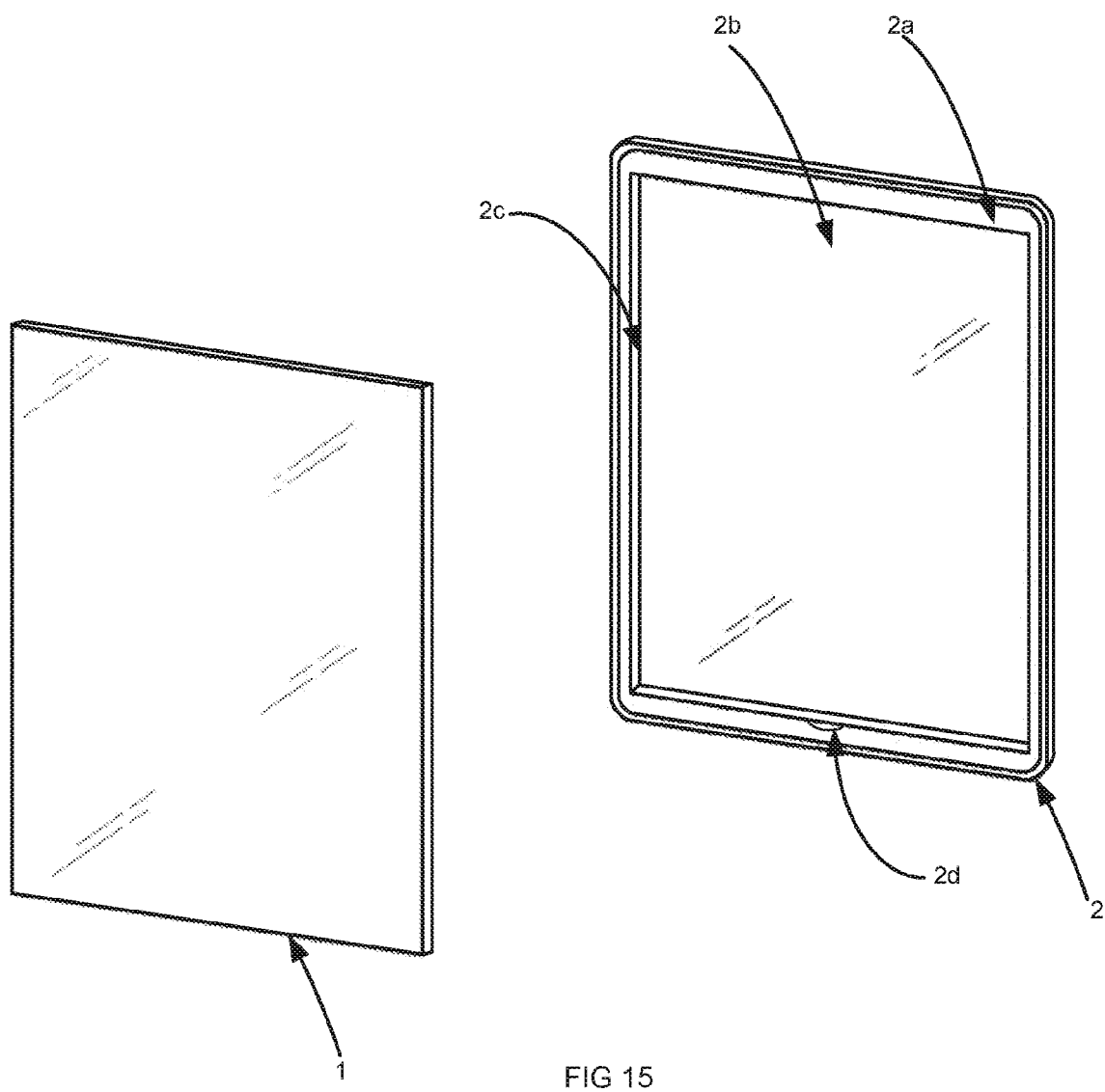
FIG. 15 is a schematic diagram illustrating of a front view of an example display apparatus with an inbuilt display on a rear face of the mount unit.
Figure 16:
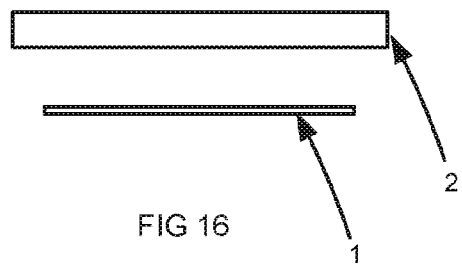
FIGS. 16 and 17 are side views of the example display apparatus of FIGS. 15 to 18.
Figure 17:
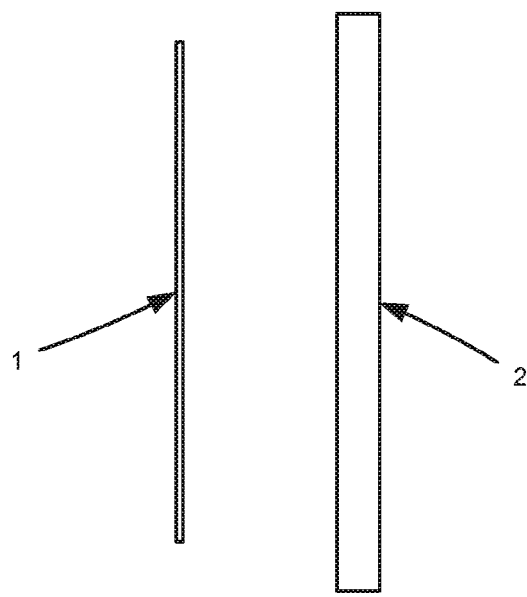
Figure 18:
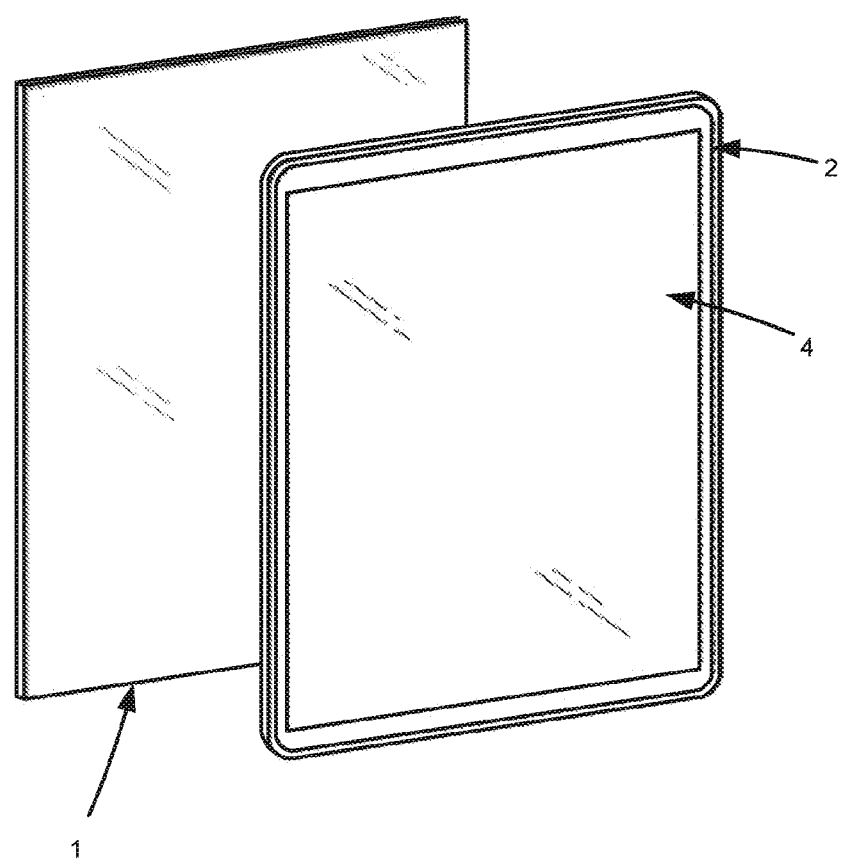
FIG. 18 is a schematic diagram illustrating the rear view of the example display apparatus of FIG. 15.

FIG. 14 illustrates an example of a display apparatus like that of FIG. 1, in which the display unit 1 is mounted in the mount unit 2 and a protective cover 3 is provided for mounting to the display unit 1 to protect the display when mounted to the mount unit 2. The protective cover 3 can attach to the peripheral edge 2a of the mount unit 2 using clips or a magnetic arrangement for example.

FIGS. 15 to 18 illustrate another example display apparatus like that of FIG. 1 but differing in that a display screen 4 is provided in-built to a rear face of the mount unit 2. This enables a user to detach the display unit 1 from the mount unit 2 and to use the display unit 1 alongside the display screen 4 of the mount unit 2.

Figure 19:
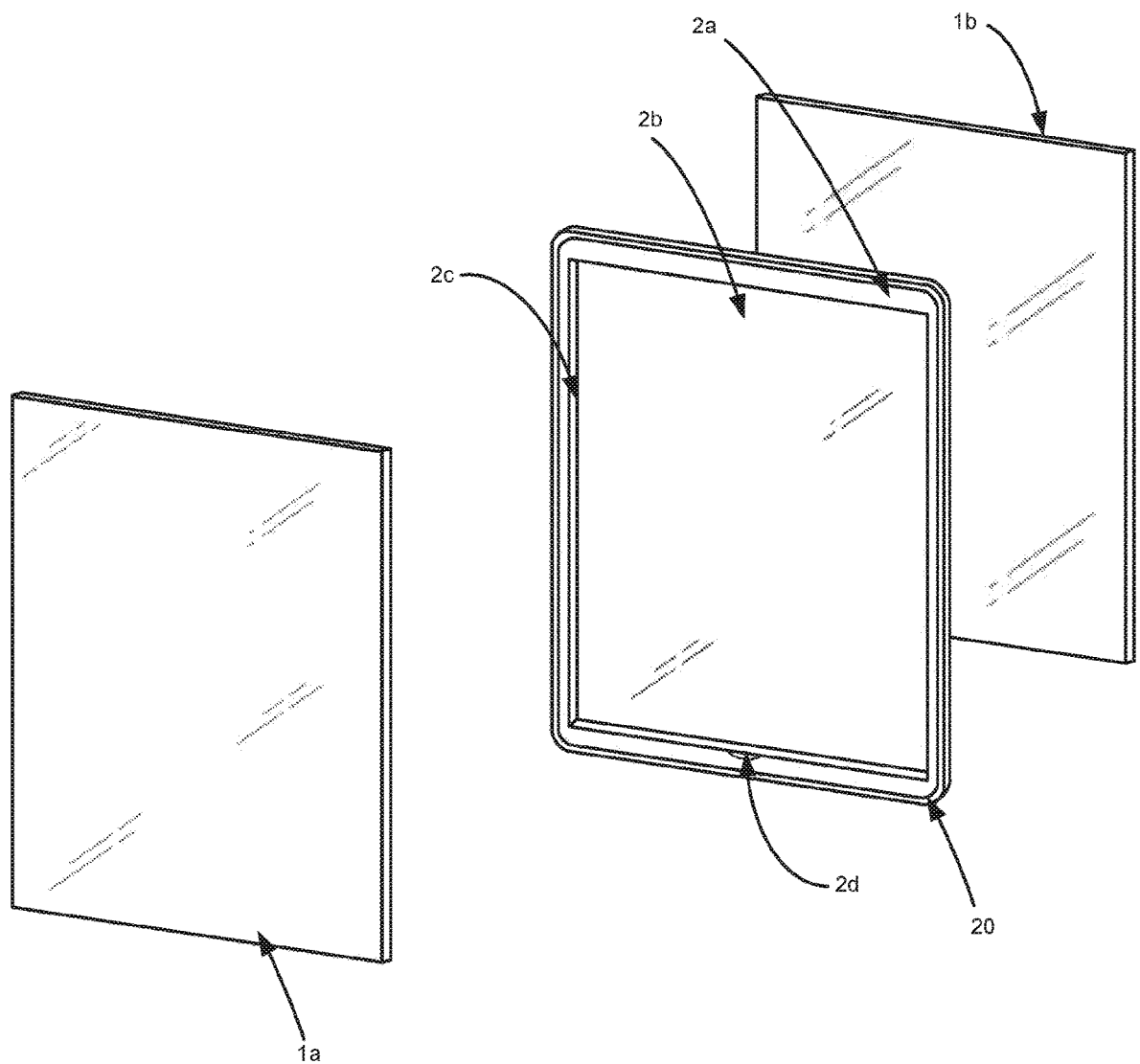
FIG. 19 is a schematic diagram illustrating of a front view of an example display apparatus with a removeable front and rear display unit shown detached.
Figure 20:
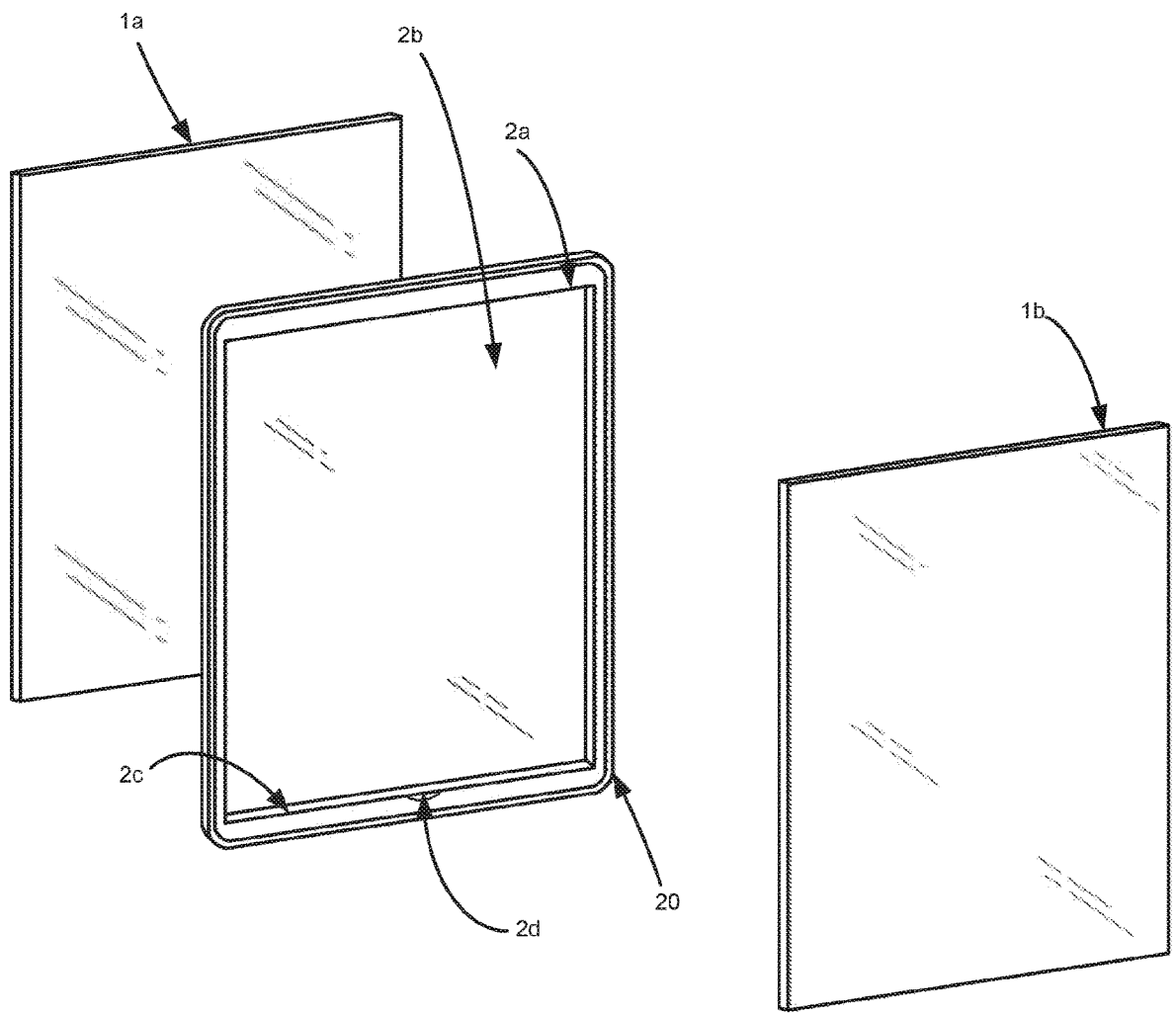
FIG. 20 is a schematic diagram illustrating the rear view of the example display apparatus of FIG. 19.
Figure 24:
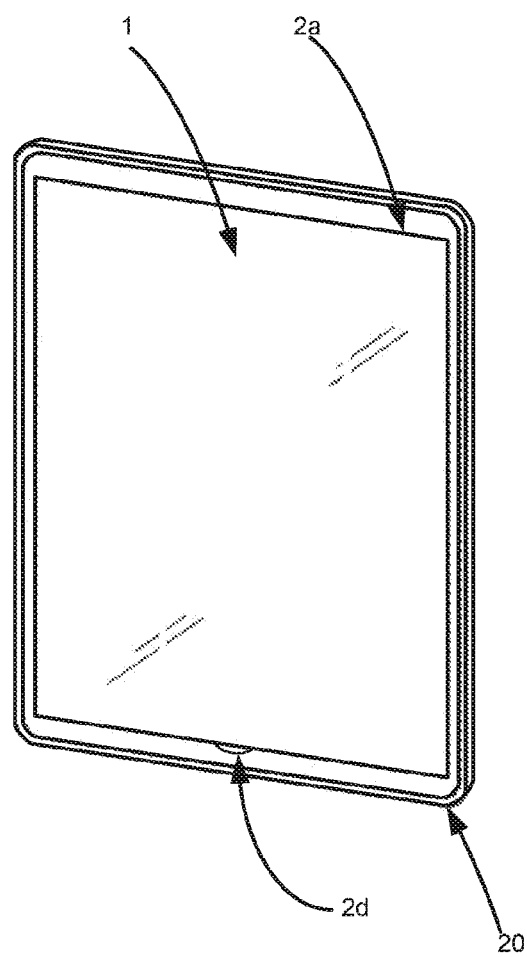
FIG. 24 is a schematic diagram illustrating of a front view of the example display apparatus of FIGS. 19 to 22 with the display units in the mount unit.
Figure 25:
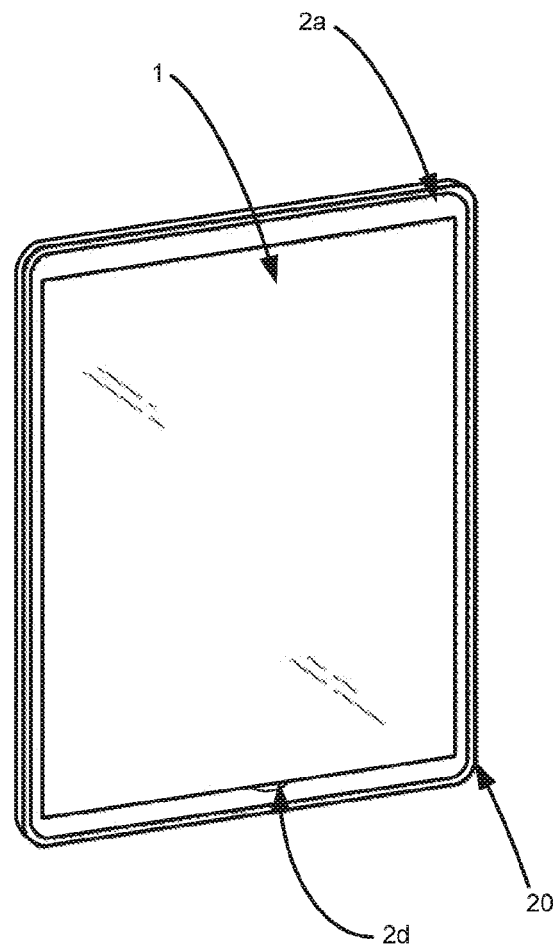
FIG. 25 is a schematic diagram illustrating of a rear view of the example display apparatus of FIGS. 19 to 22 with the display units in the mount unit.
Figure 26:
FIGS. 26 and 27 are side views of the example display apparatus of FIGS. 19 and 20 with the display units in the mount unit.
Figure 27:

FIGS. 19 to 27 illustrate another example display apparatus having two display units 1a and 1b, each being similar to the display unit 1 of FIGS. 1 to 18, and a mount unit 20 similar in some respects to the mount unit 2 of FIGS. 1 to 8, except that it is a double-sided mount allowing for two display units 1a and 1b to be mounted on opposite sides of the mount unit 20. FIGS. 19 and 20 show views from the front and the back with the display units 1a and 1b separate from the mount unit 20. FIGS. 21 and 22 are side views of the display apparatus with the display units 1a and 1b separate from the mount unit 20. FIGS. 24 and 25 show views from the front and the back with the display units 1a and 1b mounted in the mount unit 20. FIGS. 26 and 27 are side views of the display apparatus with the display units 1a and 1b mounted in the mount unit 20. FIG. 23 is a sectional view through the peripheral edge 2a of the mount unit 20. This view shows resilient arrangements 2e to engage with the edges of the display units 1a and 1b to hold the display units 1a and 1b in the recesses of the mount unit 20. Like reference numerals in FIGS. 19 to 27 refer to like features in FIGS. 1 to 8.

In the examples of FIGS. 19 to 27, the two display units 1a and 1b mounted in the mount unit 20 are accessible to be used by the user even when the display units 1a and 1b are mounted in the mount unit 20. Hence, in the mounted configuration, the display apparatus is still usable by the user.

In any of the examples of FIGS. 1 to 27, the mount unit 2 or 20 can include an adjustable mounting arrangement to allow for the holding and mounting of different sized display units. Such an adjustable arrangement can for example comprise flexible resilient arms to press against the sides of the display units so that the adjustable arrangement can be pushed wider for larger display units. Alternatively, the internal edges of the recesses 2c can include slidable elements to translationally slide to engage with the sides of the display units.

Figure 28:
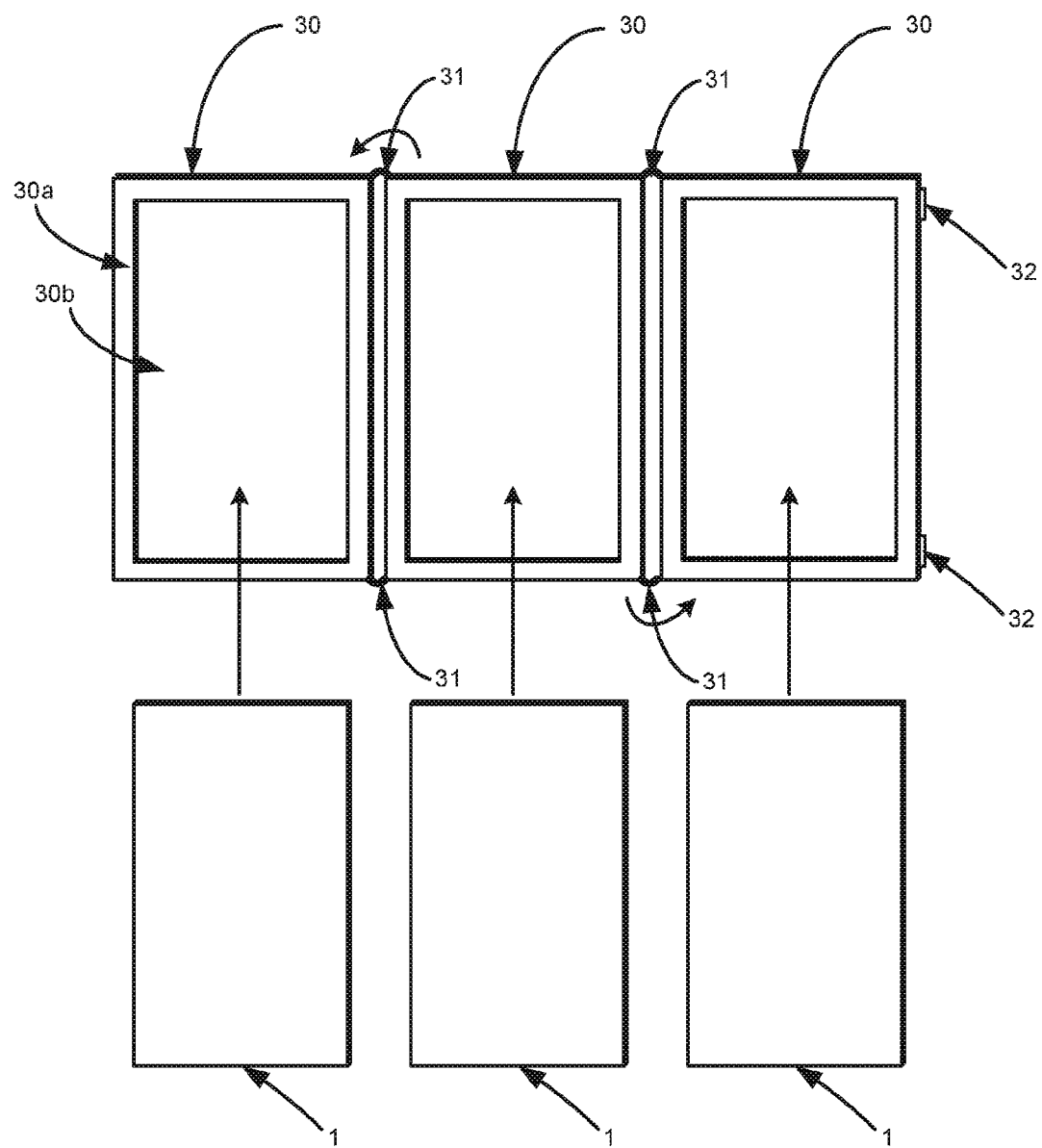
FIG. 28 is a schematic diagram illustrating an example display apparatus having frames for receiving and supporting display units.

FIG. 28 is a schematic diagram illustrating an example display apparatus having frames 30 for receiving and supporting display units 1 of the form described above. In this example, the frames 30 receive and hold the display units 1 and form the mount unit. Each frame is similar to the mount unit 2 described with reference either to FIGS. 1 to 8, whereby display units 1 are mounted to only one side of the frames 30, or similar to the mount unit 20 described with reference to FIGS. 19 to 27, whereby display units 1 are mounted to both sides of the frames 30.

Each frame 30 is hingedly connected to a neighbouring frame 30 to form a chain of frames 30 that can be folded into a stacked arrangement, such as in an alternating folded arrangement as indicated by the arrows in FIG. 28. In this example, the hinge connections 31 are formed at the either end of the long sides of the frames 30. The hinge connections 31 allow the frames 30 to be folded back on each other in a stack. Fasteners 32 can be provided to clasp the frames together in the folded stacked configuration. Hence, in this example, the mount unit comprises a stack of frames 30. In an alternative example, the hinge connections can extend along any part or all of the sides of the frames.

Figure 29:
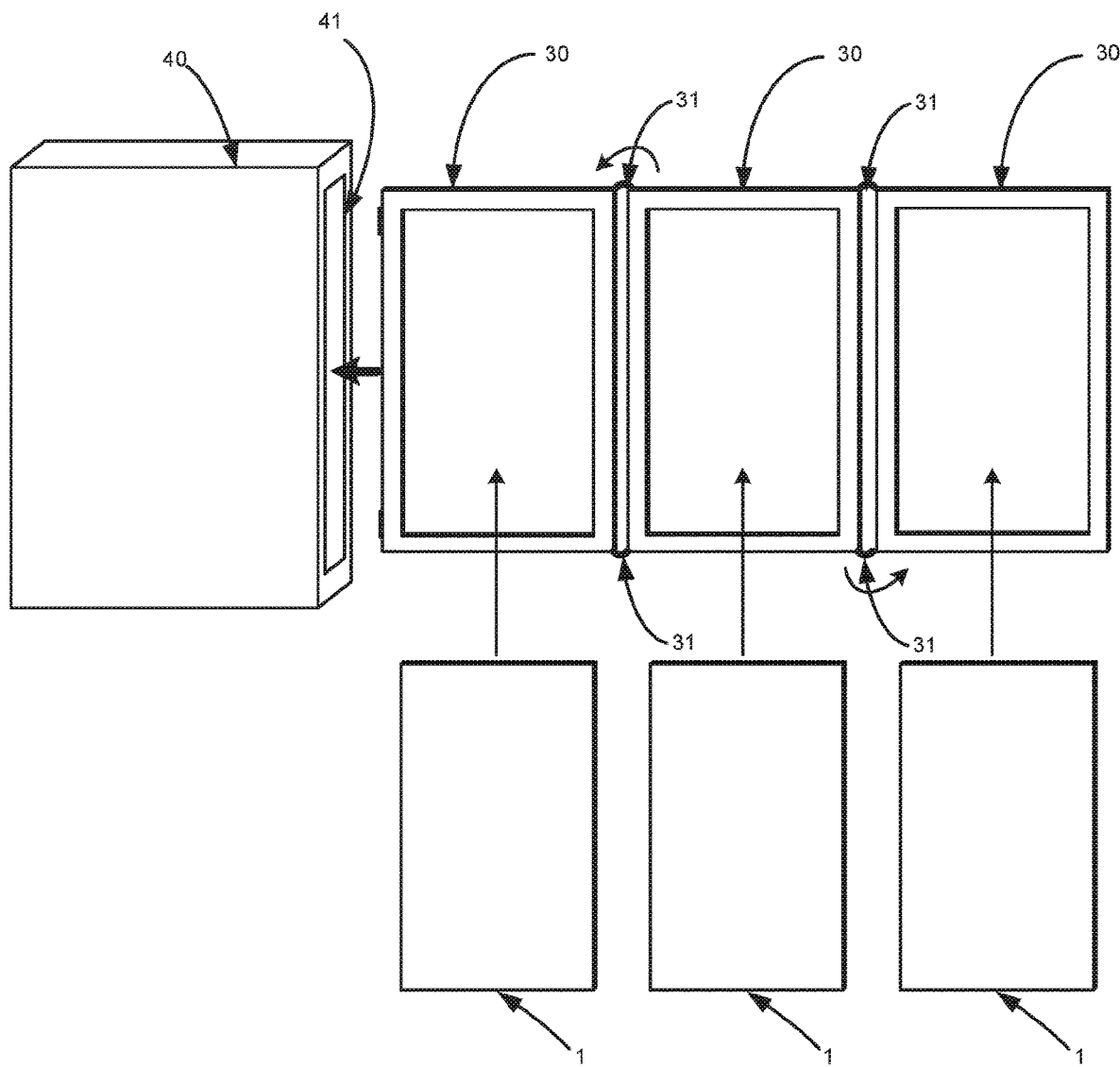
FIG. 29 is a schematic diagram illustrating an example display apparatus having frames for receiving and supporting display units which can be received and held in a mount unit.

Although not shown in FIG. 28, the frame edges can be thin so that when the display units are held, they appear near frameless. FIG. 29 is a schematic diagram illustrating an example display apparatus having frames 30 similar to the frames of the example display apparatus of FIG. 28 for receiving and supporting display units 1, which can be received and held in a mount unit 40 so as to be contained within the mount unit 50. In this way, the mount unit 40 provides a protective housing for the display units 1. The mount unit 40 can include an ejector mechanism to eject the stacked frames 30 from the mount unit 40. The stacked frames 30 can be inserted into the mount unit 40 and can be held by a resilient arrangement within the mount arrangement 40, which can be overcome by the ejection mechanism to eject the stack of frames 30.

In this example, when the frames 30 are folded into a stacked configuration, they can be inserted into a slot 41 in a side of the mount unit 40. In this example, the frames 30 can simply support the display units 1 and contain no electronic components or they can contain electronic components or connectors for cooperation with the components and connectors of the mount unit 40.

In the examples of FIGS. 28 and 29 the frames 30 provide support for the display units 1. Hence, these examples are suited for use with flexible display units. The frames support the display units to confirm their shape to a planar form for ease of storage in the frames 30 alone or also in the mount unit 40. In one example, the frames 30 are detachable and can be disconnected and reconnected in the chain to allow the frames 30 to be used separately. The display units can be used when separate from the frames or when in the frames and they can be used when the frames are connected together or detached in any combination.

In the examples of FIG. 28 or 29, the frames 30 can include an adjustable mounting arrangement to allow for the holding and mounting of different sized display units. Such an adjustable arrangement can for example comprise flexible resilient arms to press against the sides of the display units so that the adjustable arrangement can be pushed wider for larger display units. Alternatively, the internal edges of the recesses in the frames can include slidable elements to translationally slide to engage with the sides of the display units.

The frames can comprise the mount unit and hence include the electronics of the mount unit, including one or more processors, such as one per frame, memory and a battery recharging arrangement for the display units. Also, in the embodiment of FIG. 29, the frames can include electronics of the mount, such as at least the charging components. Where the frames include the electronics of the mount unit, they can still provide the mount functionality when the frames are in the extended or unfolded configuration or when the frames are separated.

Figure 30:
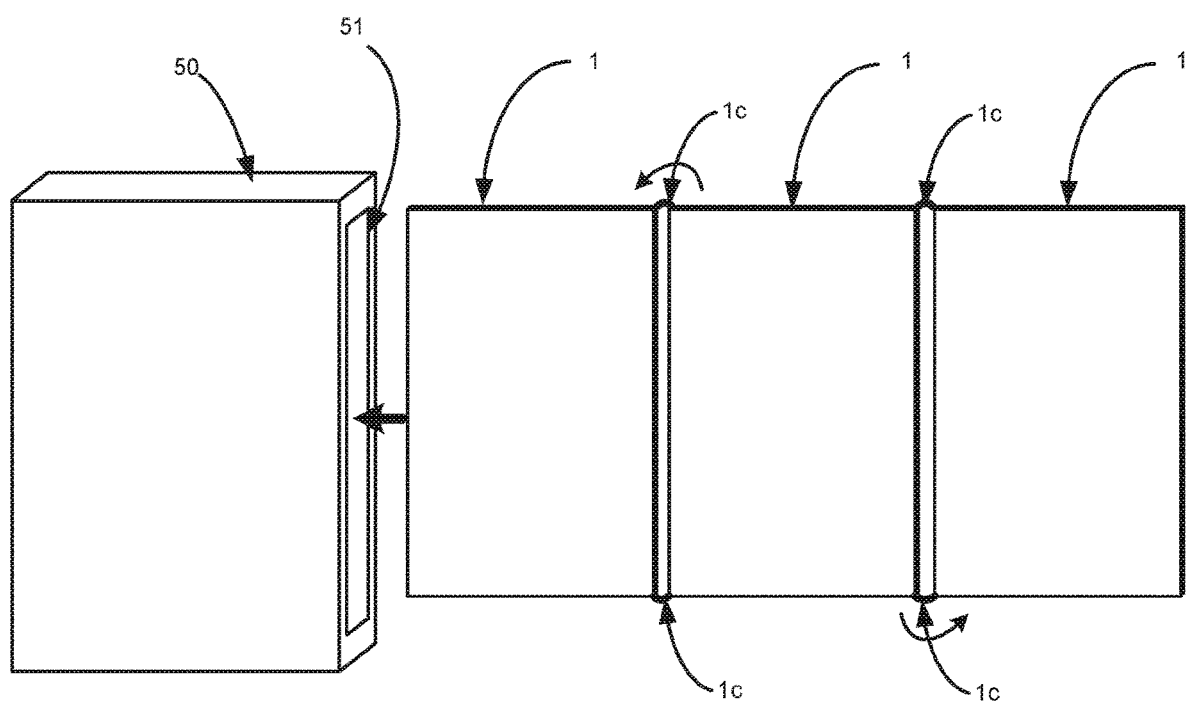
FIG. 30 is a schematic diagram illustrating an example display apparatus having foldable display units which can be received and held in a mount unit.

FIG. 30 is a schematic diagram illustrating an example display apparatus having foldable display units 1 which can be received and held in a mount unit 50. In this example, the display units 1 are generally rigid and do not require frames to support them.

Each display unit 1 is hingedly connected to a neighbouring display unit 1 to form a chain of display units 1. In this example, the hinge connections 1c are formed at the either end of the long sides of the display units 1, but they can extend along any or all of the sides of the display units. The hinge connections 1c allow the display units 1 to be folded back on each other in a stack. When the display units 1 are folded into a stacked configuration, they can be inserted into a slot 51 in a side of the mount unit 50 so as to be contained within the mount unit 50. In this way, the mount unit 50 provides a protective housing for the display units 1. The mount unit 50 can include an ejector mechanism to eject the stacked display units 1 from the mount unit 50. The stacked display units 1 can be inserted into the mount unit 50 and can be held by a resilient arrangement within the mount arrangement 50, which can be overcome by the ejection mechanism to eject the stack of display units 1.

In one example, the display units 1 can be disconnected and reconnected in the chain to allow the display units 1 to be used separately.

Figure 31:
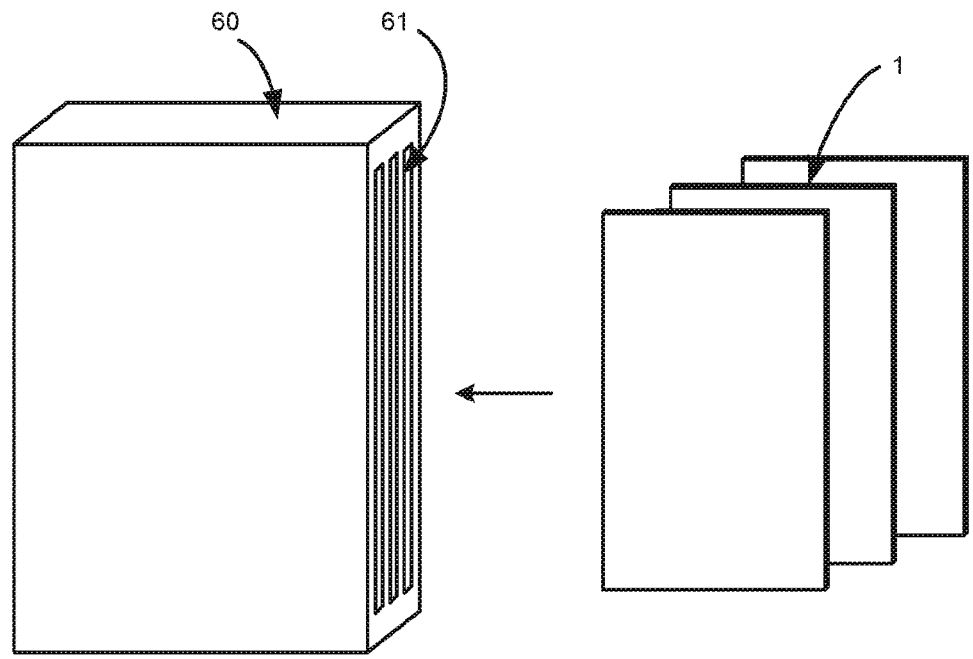
FIG. 31 is a schematic diagram illustrating an example display apparatus having display units which can be received and held in a mount unit.

FIG. 31 is a schematic diagram illustrating an example display apparatus having display units 1 which can be received and held in a contained manner in a mount unit 60. In this example the display units can be individually inserted into slots 61 in a side of the mount unit 60 to house all of the display units 1 within the mount unit 60. In this configuration, when the display units 1 are mounted in the mount unit 60, they cannot be accessed to be used. The mount unit 60 can include an ejector mechanism to eject each of the display units 1 from the mount unit 50 separately or all together. The display units 1 can be inserted into the mount unit 60 and can be held by a resilient arrangement within the mount arrangement 60, which can be overcome by the ejection mechanism to eject the display units 1 independently or all together.

Figure 32:
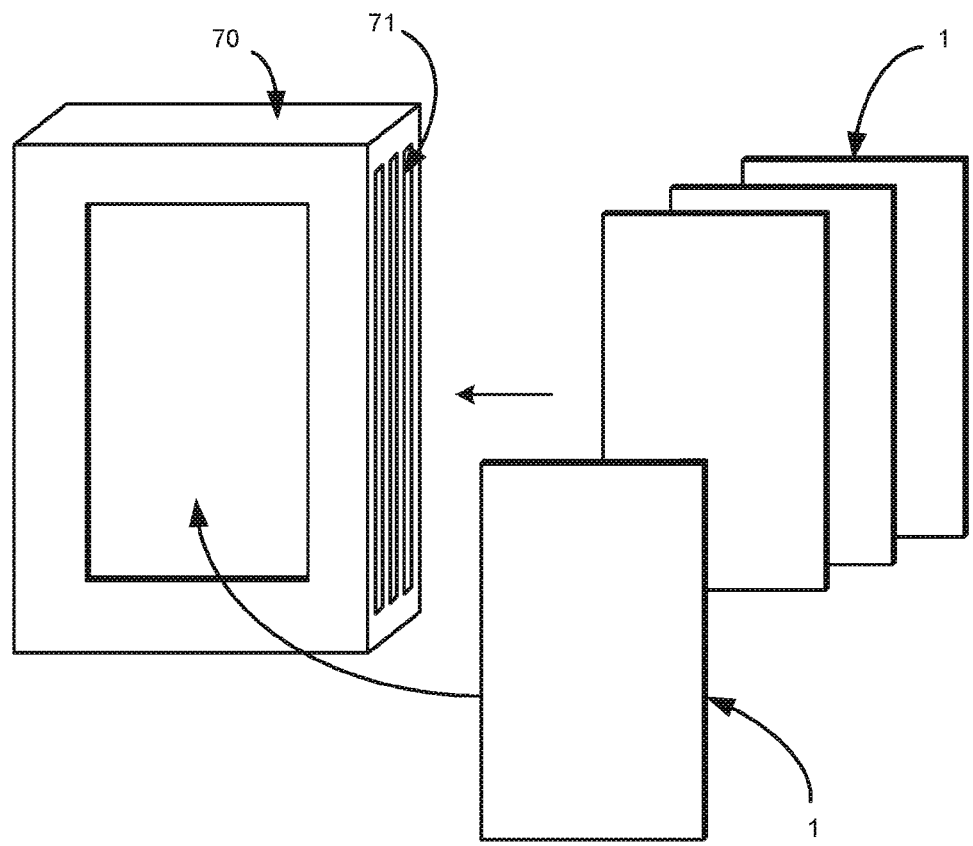
FIG. 32 is a schematic diagram illustrating an example display apparatus having display units which can be received and held in a mount unit.

FIG. 32 is a schematic diagram illustrating an example display apparatus having display units 1 which can be received and held in a mount unit 70 via slots 71 in a side of the mount unit 70 in a similar manner to the example of FIG. 31, with the addition of a recess 72 in a face of the mount unit 70 to receive and hold one of the display units 1. The display unit 1 is mounted in the recess 72 in a similar manner to the way the display unit is mounted in the mount unit 2 in the examples of FIGS. 1 to 8. This example enables one of the display units to be accessible for use even when all of the display units 1 are mounted in the mount unit 70.

Figure 33:
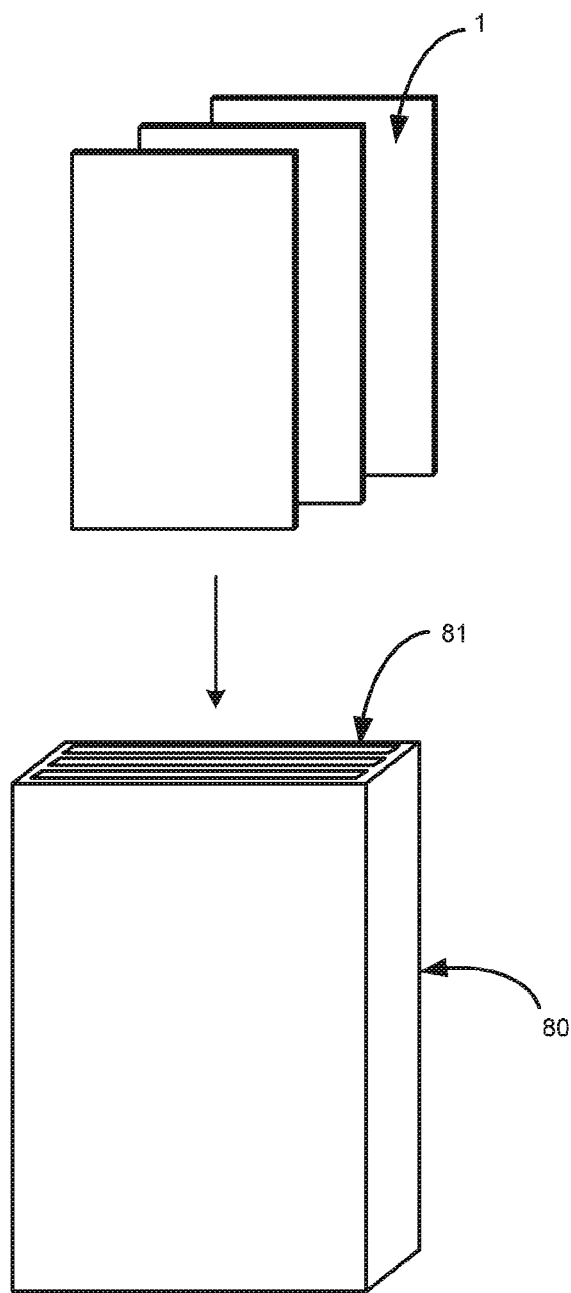
FIG. 33 is a schematic diagram illustrating an example display apparatus having display units which can be received and held in a mount unit.

FIG. 33 is a schematic diagram illustrating an example display apparatus having display units 1 which can be received and held and contained and protected within in a mount unit 80 via slots 81 in an end of the mount unit 80 in a similar manner to the example of FIG. 32. Otherwise this example is similar to that of FIG. 31.

Figure 34:
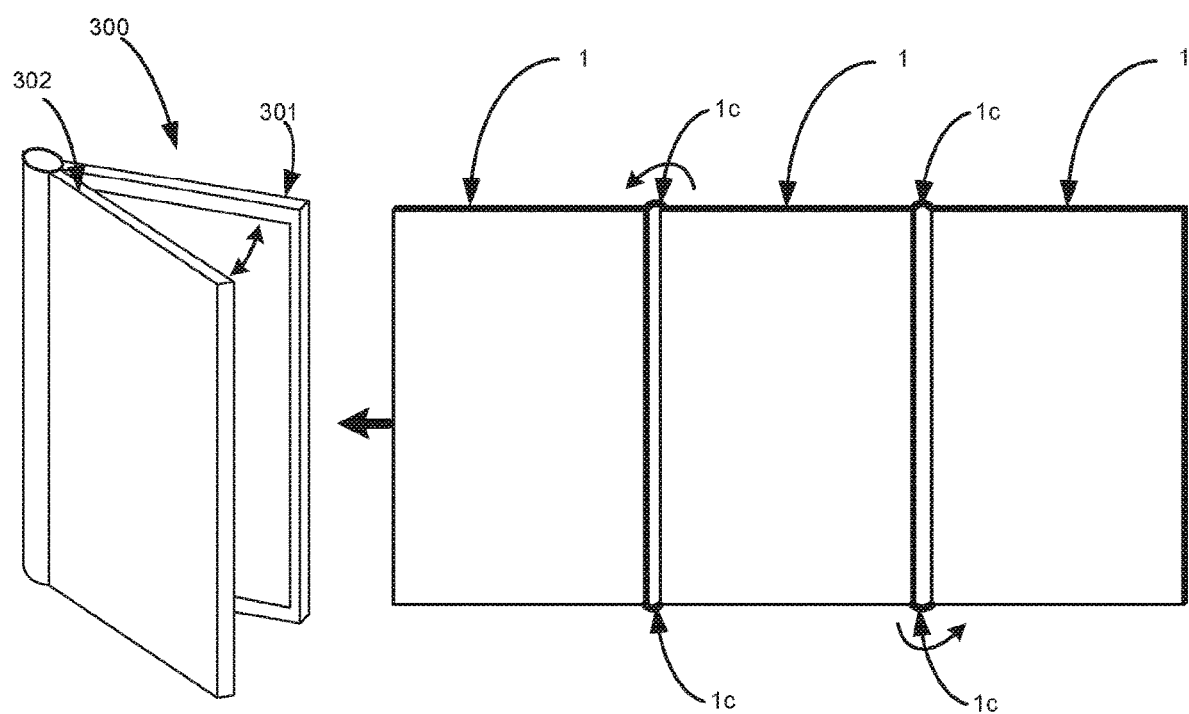
FIG. 34 is a schematic diagram illustrating an example display apparatus having a hinged two-part mount unit for receiving and holding display units.

FIG. 34 is a schematic diagram of an example display apparatus having display units 1 which can be received and held and contained and protected within in a mount unit 300. In this embodiment, the mount unit 300 comprises two parts 301 and 302 which are hinged so that the mount unit can be opened to receive the display units for the containment of the display units 1. The two parts can be fastened together in a closed configuration and the fastener can be released to allow opening of the mount unit 300.

Each display unit 1 is hingedly connected to a neighbouring display unit 1 to form a chain of display units 1. In this example, the hinge connections 1c are formed at the either end of the long sides of the display units 1, but they can extend along any or all of the sides of the display units. The hinge connections 1c allow the display units 1 to be folded back on each other in a stack. When the display units 1 are folded into a stacked configuration, they can be inserted into the mount unit 300 so as to be contained within the mount unit 300. In this way, the mount unit 300 provides a protective housing for the display units 1.

Although the two parts 301 and 302 of the mount unit are shown hinged in this embodiment, they can be separate or connected together in any configuration that allows them to be separated for insertion of the display units 1 and containment of the display units 1. Also, although hinged display units 1 are illustrated, one or more separate display units can be inserted into a mount unit of two parts. At least one display unit can be fitted to a frame before being inserted into the mount unit.

The two parts 301 and 302 may be folded back partly to expose one of the display units, or completely so that the outer faces of the parts 301 and 302 touch. When display units are mounted within the two parts 301 and 302 and held by the two parts 301 and 302, one or more display units can be held by one or more of the parts 301 and 302 so that their displays face inward towards each other when the parts 301 and 302 are closed and face outwards on when the parts 301 and 302 are folded open on each other so that one or two displays or a respective one or two display units are visible to a user as one or two outer faces of the display apparatus comprising the mount unit and the one or more display units. This enables one or two of the display units to be operative and useable by a user while held by the mount unit. For example, one display unit could fit into a recess in a part 301 or 302 and when the parts are open, the display unit can be accessed for use. Similarly, if two display units are fitted into respective recesses in respective parts 301 and 302, when the parts 301 and 302 are open both display units can be accessed for use. The two parts can be partially opened at an angle such as about a right angle or fully opened and folded back to a flat arrangement with faces of the parts 301 and 302 that are outer faces when the parts 301 and 302 are closed touching.

In any of the examples of FIGS. 30 to 34, the mount unit 60, 70, 80 can include an adjustable mounting arrangement to allow for the holding and mounting of different sized display units. Such an adjustable arrangement can for example comprise flexible resilient arms to press against the sides of the display units as they are inserted into the slots 61, 71, 81 so that the adjustable arrangement can be pushed wider for larger display units.

Figure 35:
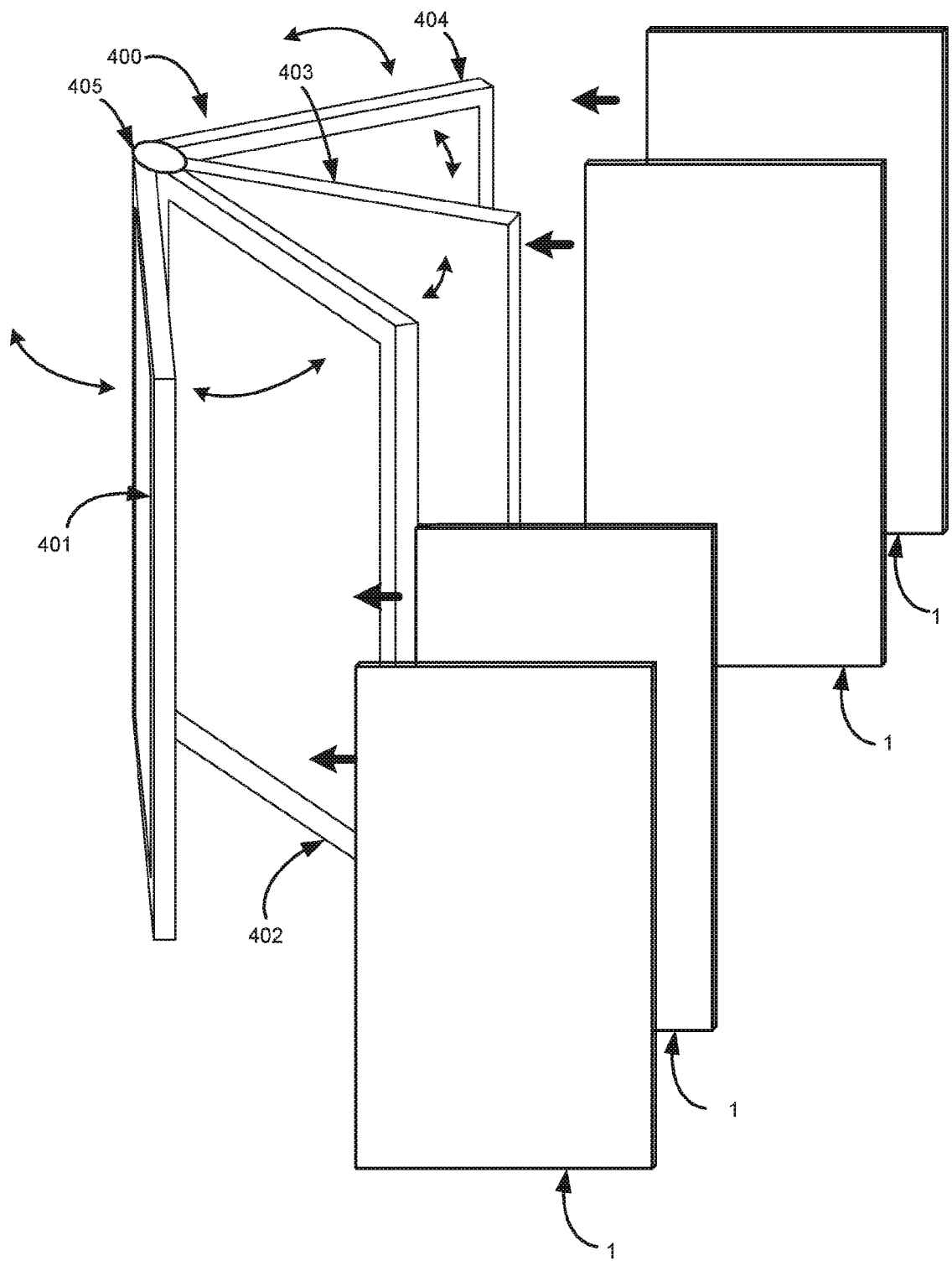
FIG. 35 is a schematic diagram illustrating an example display apparatus having a hinged mount unit comprising two pairs of hinged parts for receiving and holding display units.

FIG. 35 is a schematic diagram illustrating an example display apparatus having a hinged mount unit 400 for receiving and holding display units 1. The hinged mount unit 400 comprises a plurality of hinged parts 401, 402, 403, and 404 that are free to hinge about a pivot member 405 (hinge region). The hinged parts 401, 402, 403, and 404 are each configured to receive display units 1 as a pair of hinged parts i.e. two pairs of hinged parts 301 and 302 in the embodiment of FIG. 34. In this example a first pair of hinged parts 401 and 402 receives, holds and contains one or more display units (two shown in this example) when the hinged parts 401 and 402 are closed around the display unit or units 1. A second pair of hinged parts 403 and 404 receives, holds and contains one or more display units (two shown in this example) when the hinged parts 403 and 404 are closed around the display unit or units 1. Hence, in this example, there are two separate containment regions provided by the mount 400.

Hence in this example, the mount unit 400 mounts the display units 1 in a plurality (two in this example) of containment regions when hinged to a closed position that can also be opened like pages of a book. Hence, the mount unit 400 enables the display units 1 to be removed for separate use, but also allows the display units 1 to be used while mounted in a manner resembling pages of a book. This arrangement allows for the display units 1 to be held within and contained within the mount unit 400 in a protective manner.

In the example of FIG. 35, the hinged parts 401, 402, 403, and 404 can include an adjustable mounting arrangement to allow for the holding and mounting of different sized display units. Such an adjustable arrangement can for example comprise flexible resilient arms to press against the sides of the display units so that the adjustable arrangement can be pushed wider for larger display units. Alternatively, internal edges the recesses in the hinged parts 401, 402, 403, and 404 can include slidable elements to translationally slide to engage with the sides of the display units.

Although two pairs of hinged parts are illustrated in FIG. 35, in one embodiment the parts between pairs can be combined into a single common part. For example, parts 402 and 403 can be common. This reduces the number of moving parts while still providing a plurality of separate containment regions for one or more display units.

In any of the embodiments of FIGS. 29 to 35, the mount unit can be configured to receive the display units individually or as a group or to receive one or more frames holding one or more display units in one or more slots, racks, or grooves with physical charging connectors or a wireless charging capability. Physical connectors can also be provided for data communication between the display unit or units and the mount or the display unit or units via the or each frame. The display unit or units can also or alternatively communicate with the mount unit using short range wireless communication. The display units can be flexible display units, rigid display units or a combination of types of display units.

In all of the examples described above, the display unit can comprise a touch screen and/or can include camera to enable user gesture control.

Figure 36:
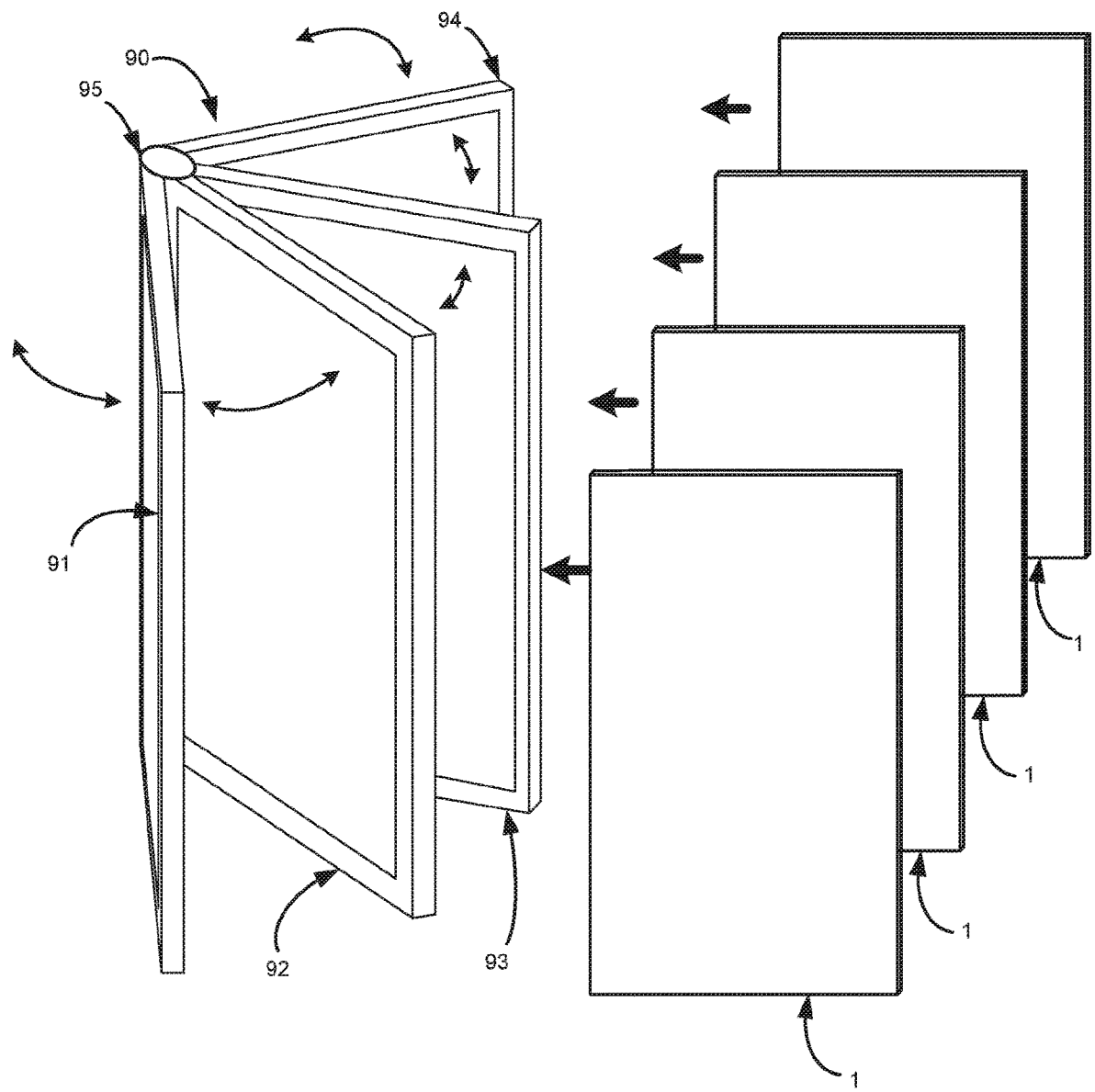
FIG. 36 is a schematic diagram illustrating an example display apparatus having a hinged mount unit for receiving and holding display units.

FIG. 36 is a schematic diagram illustrating an example display apparatus having a hinged mount unit 90 for receiving and holding display units 1. The hinged mount unit 90 comprises a plurality of hinged frames 91, 92, 93 and 94 that are free to hinge about a pivot member 95 (hinge region). Each hinged frame 91, 92, 93, and 94 is similar to the frames 30 of the example illustrated in FIGS. 28 and 29. The frames 91, 92, 93 and 94 are each configured to receive a display unit 1 in a similar manner to the way the display unit is received in the mount unit 2 in the example of FIGS. 1 to 8, when the frames 91, 92, 93 and 94 receive display units on only one side thereof, of in a similar manner to the way the display units are received in the mount 20 in the example of FIGS. 19 to 27. Alternatively, the frames 91, 92, 93, and 94 can receive and hold display units 1 on both sides to provide for two-sided information display.

Hence in this example, the mount unit 90 mounts the display units 1 in a plurality of frames 91, 92, 93 and 94 that can be in a stacked configuration when hinged to a closed position but can also be opened like pages of a book. Hence, the mount unit 90 enables the display units to be removed for separate use, but also allows the display units 1 to be used while mounted in a manner resembling pages of a book. This arrangement allows for the display units to be held within and contained within the mount unit 90 in a protective manner.

In the example of FIG. 36, the frames 91, 92, 93 and 94 can include an adjustable mounting arrangement to allow for the holding and mounting of different sized display units. Such an adjustable arrangement can for example comprise flexible resilient arms to press against the sides of the display units so that the adjustable arrangement can be pushed wider for larger display units. Alternatively, the internal edges of the recesses in the frames can include slidable elements to translationally slide to engage with the sides of the display units.

In all of the examples described above, the display unit can comprise a touch screen and/or can include camera to enable user gesture control. Also, the frames 91, 92 93 and 94 can be detachable from the pivot member 95.

Figure 37:
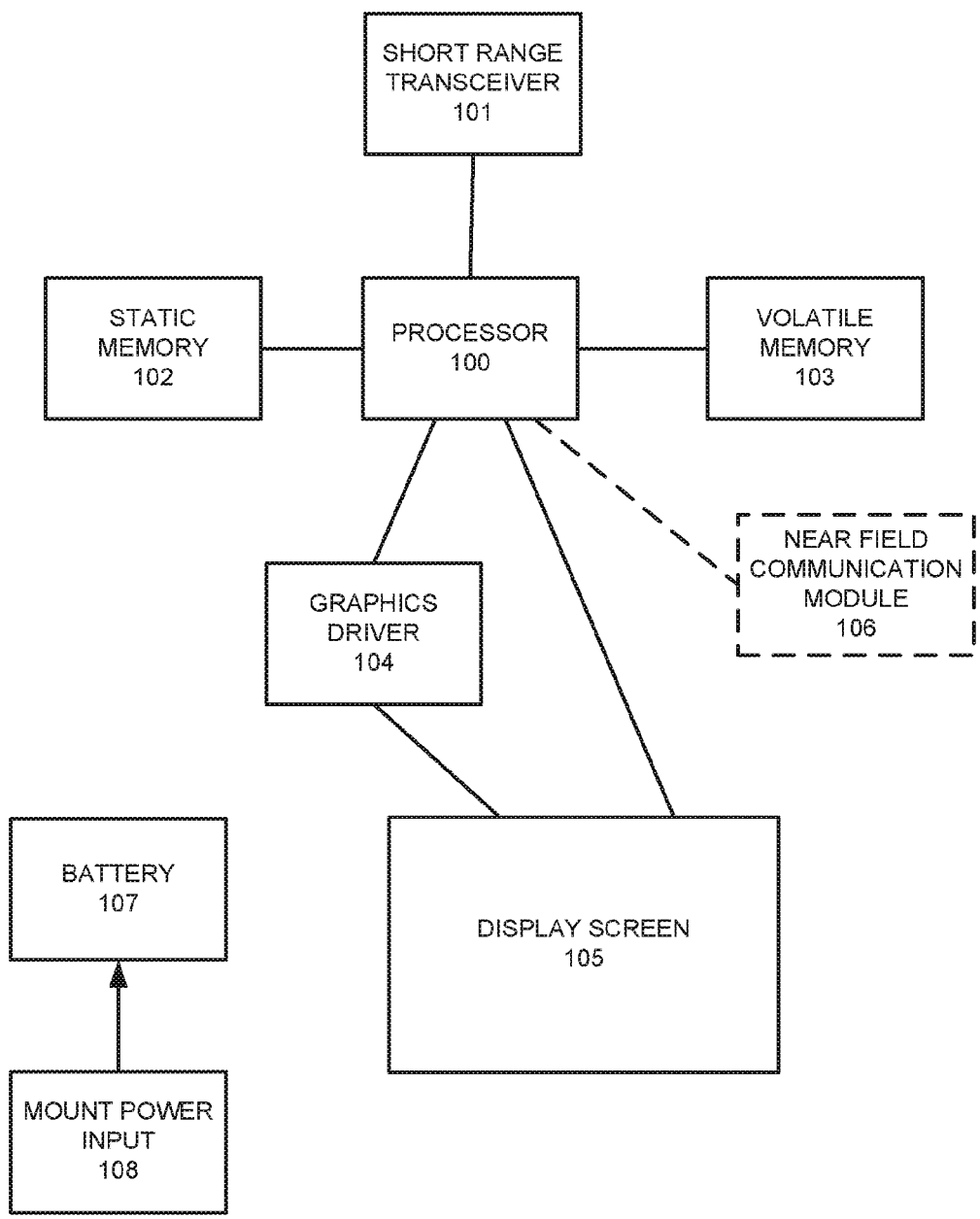
FIG. 37 is a schematic diagram illustrating the electronic components of an example display unit.

FIG. 37 is a schematic diagram illustrating the electronic components of an example display unit 1, such as used in the examples described above.

A processor 100 is connected to static memory 102 storing code used by the processor such as operating system code and for the storage of data in a non-volatile manner. Volatile memory 103 is provided for the storage of application code and data and information for display. A graphics driver 104 is provided for the control of a display screen 105, which can be a touch sensitive display screen to provide user input responsive to the displayed information. A battery 107 provides the power for the electronics and a mount power input 108 is provided to enable the battery 107 to be recharged when the display unit 1 is mounted in the mount unit. The mount power input 108 can comprise a physical coupling to display power output 205 of the mount unit, or alternatively induction coupling can be used.

A short range/low power transceiver 101 is connected to the processor 100 for short range and low power communications with a short range and low power transceiver in a mount unit. This communication link can be used to pass data, information and controls between the display unit and the mount unit. It allows the display unit to access a communications network such as the internet via the mount unit. It also enables the processor of the mount unit and the processor of the display unit to cooperate or share processing of information required by the display unit to reduce the processing power requirement of the processor 100 in the display unit. The low power/short range communication protocol employed could be Bluetooth™. The display unit can be paired with the mount unit using the Bluetooth protocol for secure communications therebetween.

Optionally, the display unit can include a module for the detection of an adjacent display unit. In this example, the module can comprise a near field communication module 106.

Figure 38:
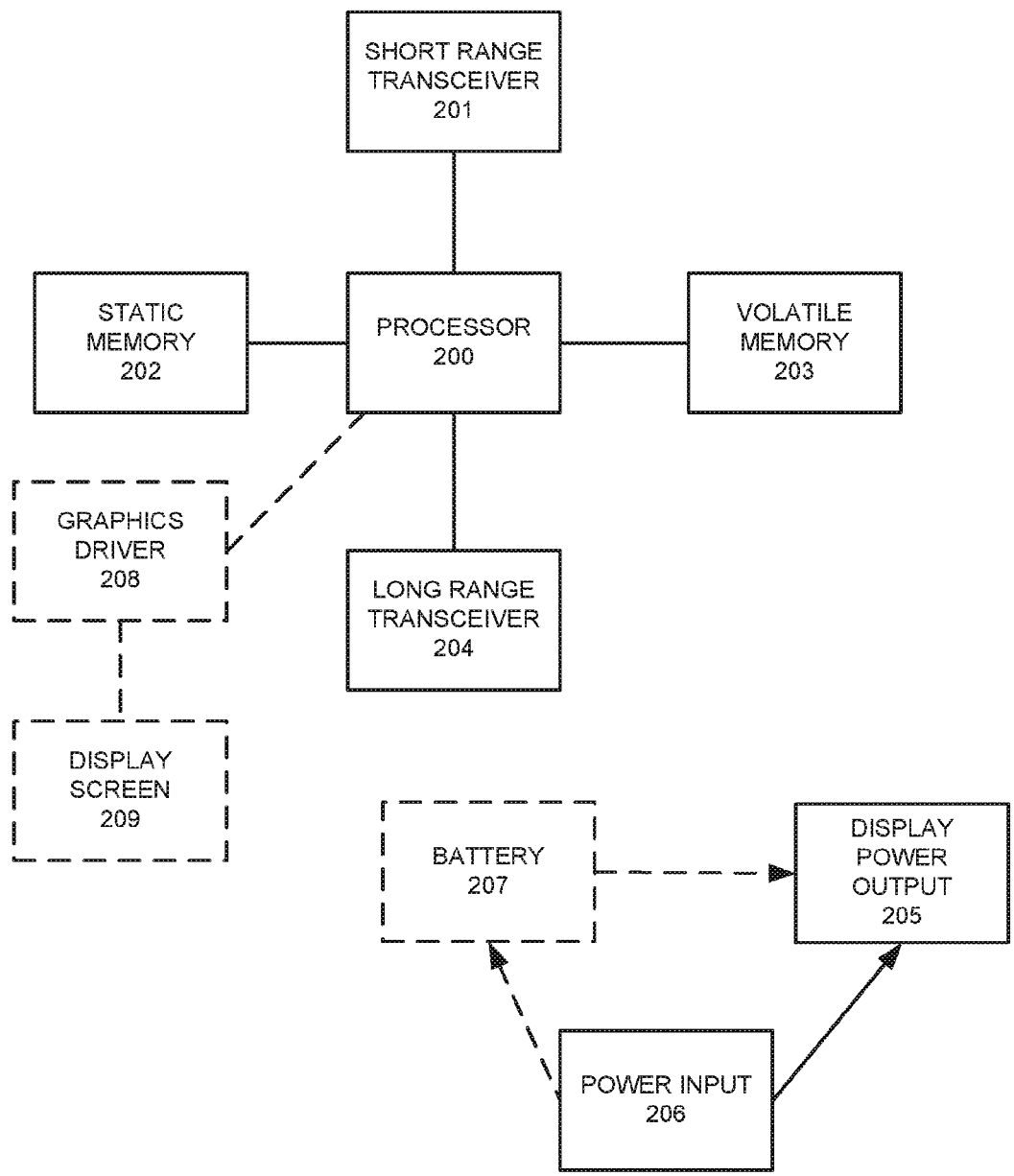
FIG. 38 is a schematic diagram illustrating the electronic components of an example mount unit.

FIG. 38 is a schematic diagram illustrating the electronic components of an example mount unit used in any of the described examples.

A processor 200 is connected to static memory 202 storing code used by the processor such as operating system code and for the storage of data in a non-volatile manner. Volatile memory 203 is provided for the storage of application code and data and information for display.

A short range/power transceiver 201 is connected to the processor 200 for short range and low power communications with a short range and low power transceiver in one or more display units. This communication link can be used to pass data, information and controls between the display unit and the mount unit. As described above, it allows the display unit to access a communications network such as the internet via the mount unit and it enables the processor of the mount unit and the processor of the display unit to cooperate or share processing of information required by the display unit to reduce the processing power requirement of the processor 100 in the display unit. The low power/short range communication protocol employed could be Bluetooth™. The or each display unit can be paired with the mount unit using the Bluetooth protocol for secure communications therebetween.

A longer range and higher power transceiver 204 are provided for RF communication with a communications network. The longer range and higher power communication protocol used by the longer range and higher power transceiver 204 of the mount unit could be WIFI, WiMAX, CDMA, GSM, GPRS, wireless local loop or WAN.

A display power output 205 provides power to the mount power input 108 of the or each display unit and can comprise a physical coupling or alternatively induction coupling can be used. A power input 206 provides the power to the mount unit and to the display power output 205 from a mains power connection.

The mount unit can optionally include an in-built display screen 209 with an accompanying display driver 208.

A battery 207 can be provided to provide power for the electronics when the mount unit is not connected to a mains supply in a portable configuration. The battery 207 can provide the power to the display power outlet 205 when the mains supply is not connected to the power input 206. The power input 206 can provide power to recharge the battery 207 when the mount unit is not connected to a mains supply.

Figure 39:
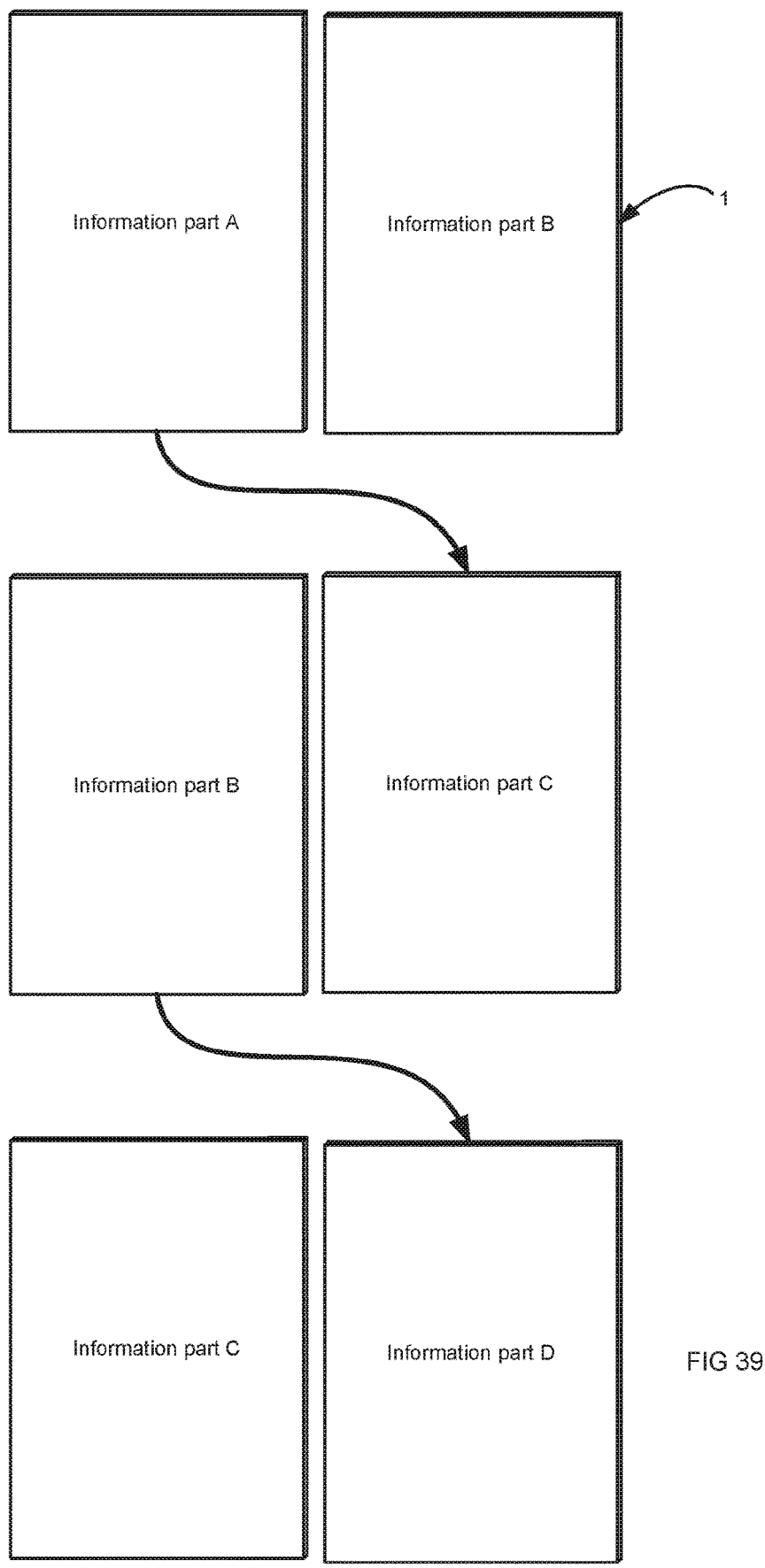
FIG. 39 is a schematic diagram illustrating an example electronic display apparatus comprising a plurality of display units that detect the proximity of adjacent display units for the control of the display of information.

FIG. 39 is a schematic diagram illustrating example electronic display apparatus comprising a plurality of display units 1 that detect the proximity of adjacent (e.g. side by side) display units 1 for the control of the display of information. The display units can comprise the display units as described above for any of the example display apparatuses.

Illustrated in FIG. 39 is a pair of display units 1 lying adjacent to one another in three successive operations. In the top configuration the pair of display units display consecutive information parts A and B of a set of information. For example, the information parts could be consecutive parts of a sequence of information, such as pages of text or sequential images in a library. When the user wishes to read the next consecutive information part, part C, the user moves one of the display units to switch the relative positions of the display units. As shown by the arrow moving to the second configuration of the pair of display units. The detection arrangements within the display units detects the change in relative positions of the display units and the processor 100 acting as a display controller, updates the displayed information parts such that the right-hand display unit now displays information part C. The display panel that was on the right-hand side displaying information part B is now on the left-hand side.

When the user wishes to read the next consecutive information part, part D, the user moves one of the display units to switch the relative positions of the display units. As shown by the arrow moving to the third configuration of the pair of display units. The detection arrangements within the display units detects the change in relative positions of the display units and the processor 100 acting as a display controller, updates the displayed information parts such that the right-hand display unit now displays information part D. The display panel that was on the right-hand side displaying information part C is now on the left-hand side.

Although the operation of switching the display shows the incrementing of the displayed information parts by moving the display units from left to right, the reverse operation also applies. To decrement displayed information parts, a user can move the right-hand display to the left of the left hand display. Hence the arrows shown in FIG. 37 can be reversed. Since the relative position end position of the display units following an incremental or decremental movement is the same, a detection arrangement in the display units detects which of the display units is moved over the other in order to determine whether the motion is an instruction to increment or decrement the display of an information part. For example, if the left hand display unit is lifted and moved over the right hand display unit, this can be detected by the detector arrangement in the left hand display unit and the left hand display unit can be controlled to increment the displayed information part from part A for example to part C. If the right hand display unit is lifted and moved over the left hand display unit, this can be detected by the detector arrangement in the right hand display unit and the right hand display unit can be controlled to decrement the displayed information part from part C for example to part A.

The display units in this example are light weight display units and hence can be handled by a user in a similar manner to paper, which is a medium that a user is used to handling. Hence, the use of two display units side by side is similar to an open book or magazine where two pages are shown at once. Conventionally, to view a next page, a user turns a page. In this example a user 'turns' a display unit by moving the left-hand display unit to the right or the right-hand display unit to the left, whichever feels more comfortable to the user and whichever way a user reads, depending upon the language.

Hence, the embodiment illustrated in FIG. 38 includes a method of using display units as illustrated and described above.

Figure 40:
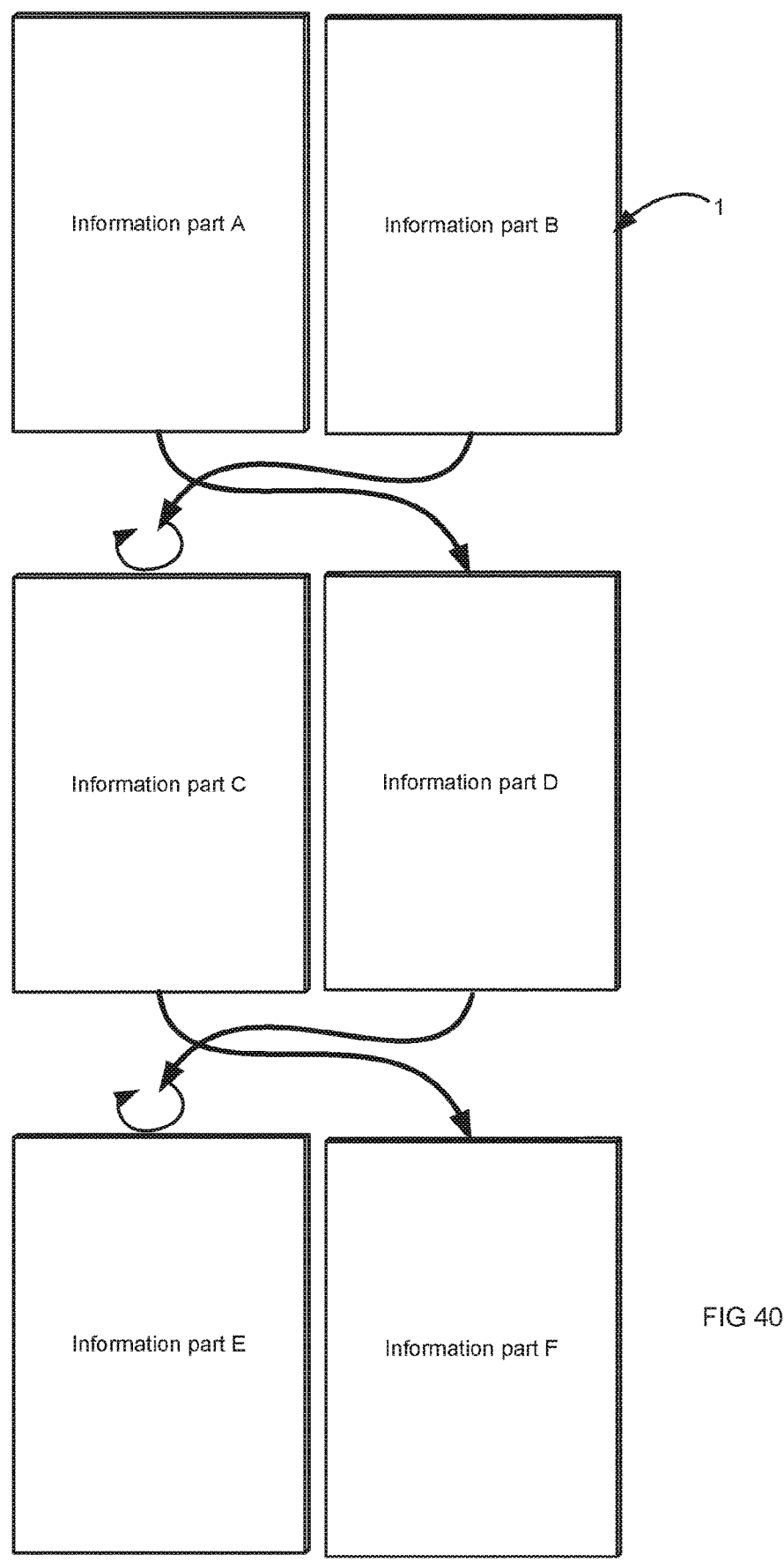
FIG. 40 is a schematic diagram illustrating an example electronic display apparatus comprising a plurality of display units that detect the proximity of adjacent display units for the control of the display of information.

FIG. 40 is a schematic diagram illustrating another example electronic display apparatus comprising a plurality of display units that detect the proximity of adjacent display units for the control of the display of information.

In this example, one or both of the display units 1 comprise two-sided display units with displays on opposed faces of the display unit. Hence, in this example, the 'turning' of the page, as described for the previous example, can be enhanced by lifting and turning the right-hand display in a similar manner to turning a page of a book or magazine as illustrated by the arrows and the rotational arrows moving the right-hand display unit at each configuration.

In the top configuration the pair of display units display consecutive information parts A and B of a set of information. For example, the information parts could be consecutive pages of text. When the user wishes to read the next consecutive information part, part C, the user moves the right-hand display unit to the left-hand side of the left-hand display unit and turns the right-hand display unit over, as shown by the arrows moving to the second configuration of the pair of display units. The detection arrangements within the display units detects the change in relative positions of the display units and the processor 100 acting as a display controller, updates the displayed information parts such that the left-hand display unit now displays information part C and the right-hand display unit now displays information part D. In this example two new information parts, e.g. text pages, are displayed.

When the user wishes to read the next consecutive information part, part E, the user moves the right-hand display unit to the left-hand side of the left-hand display unit and turns the right-hand display unit over as shown by the arrows moving to the third configuration of the pair of display units. The detection arrangements within the display units detects the change in relative positions of the display units and the processor 100 acting as a display controller, updates the displayed information parts such that the left-hand display unit now displays information part E and the right-hand display unit now displays information part F.

The movement of the right-hand display unit combined with the turning operation provides a user with the intuitive feel of the turning of a page in a book or magazine.

In this example, the information parts can also be decremented by the reverse actions shown in FIG. 40, by lifting the left hand display unit and turning it in the opposition direction for example.

This embodiment illustrates an example where the language of the text reads from left to right. If the language of the text is read from right to left, the operations will be reversed.

Hence, the embodiment illustrated in FIG. 39 includes a method of using display units as illustrated and described above.

Figure 41:
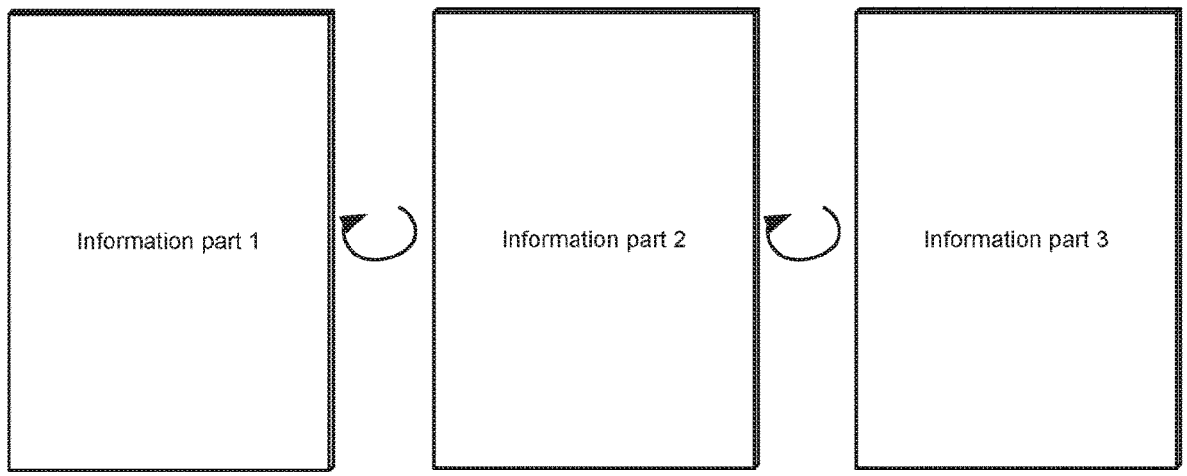
FIGS. 41 to 43 are schematic diagrams illustrating a plurality of display units that detect the proximity of adjacent display units for the control of the display of information.
Figure 42:
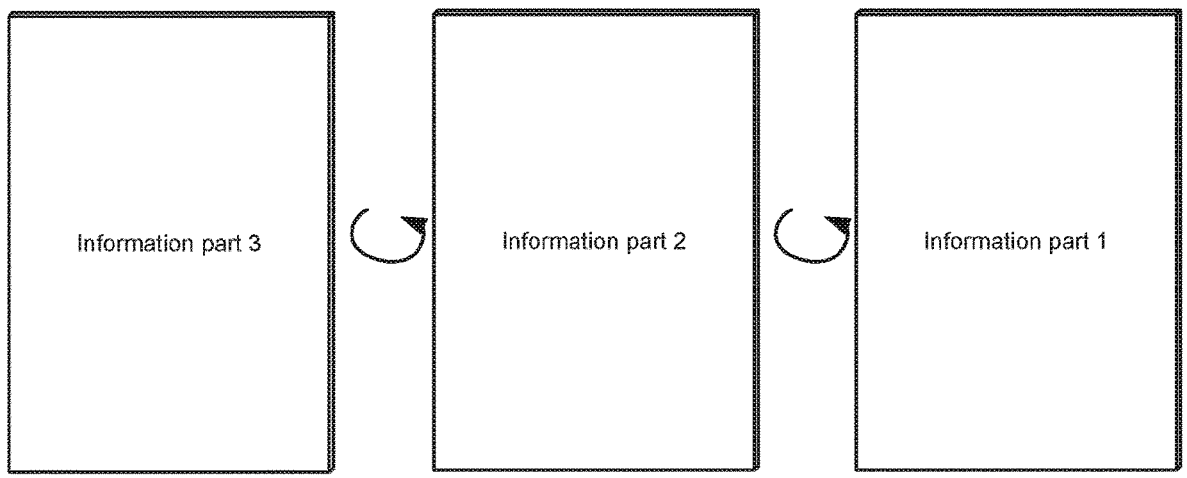
Figure 43:
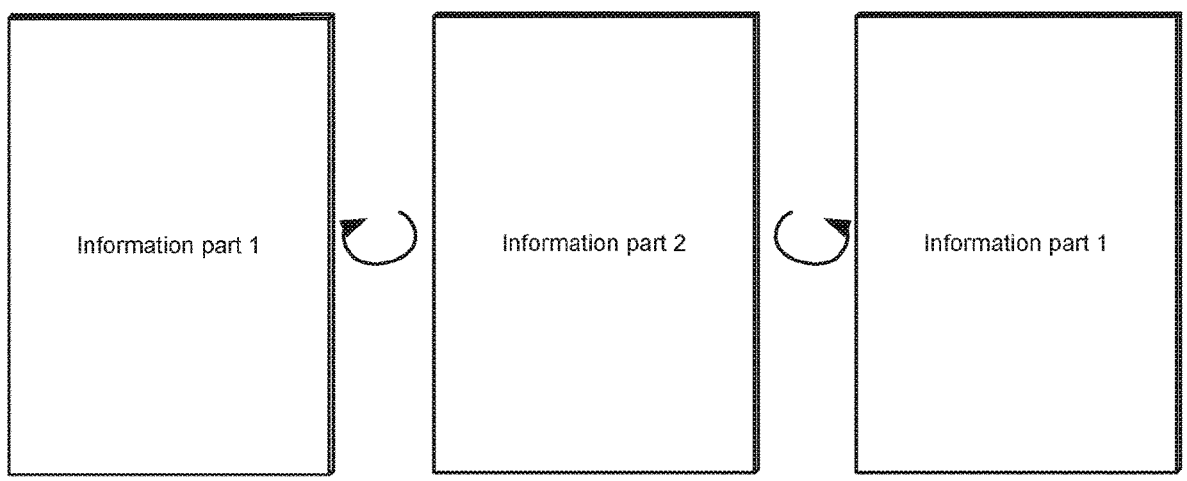

FIGS. 41 to 43 are schematic diagrams illustrating a double sided display unit having displays on opposed faces operated to display sequential parts of a sequence of information parts, such as pages of text or images in a sequence of images, such as a library.

In FIG. 41 an operation sequence to increment the display of information parts is illustrated. A first display of the display unit initially displays information part 1 on a display on one side. The display unit is then picked up and rotated or turned over in a first direction as indicated by the arrow and a second display of the display unit detects that it is now facing upwards and displays the next information part, part 2. The display unit is then picked up and rotated or turned over again in the first direction as indicated by the arrow and the first display of the display unit detects that it is now facing upwards and displays the next information part, part 3.

In FIG. 42 an operation sequence to decrement the display of information parts is illustrated. A first display of the display unit initially displays information part 3 on a display on one face. The display unit is then picked up and rotated or turned over in a second direction as indicated by the arrow and a second display of the display unit detects that it is now facing upwards and displays the previous information part, part 2. The display unit is then picked up and rotated or turned over again in the second direction as indicated by the arrow and the first display of the display unit detects that it is now facing upwards and displays the previous information part, part 1.

In FIG. 43 an operation sequence to both increment and decrement the display of information parts is illustrated. A first display of the display unit initially displays information part 1 on a display on one face. The display unit is then picked up and rotated or turned over in a first direction as indicated by the arrow and a second display of the display unit detects that it is now facing upwards and displays the next information part, part 2. The display unit is then picked up and rotated or turned over again in a second direction as indicated by the arrow and the first display of the display unit detects that it is now facing upwards and displays the previous information part, part 1.

This operation of a double sided display unit provides an intuitive reading operation similar to the turning of the pages of a book.

Hence, the embodiment illustrated in FIGS. 41 to 43 includes a method of using display units as illustrated and described above.

Figure 44:
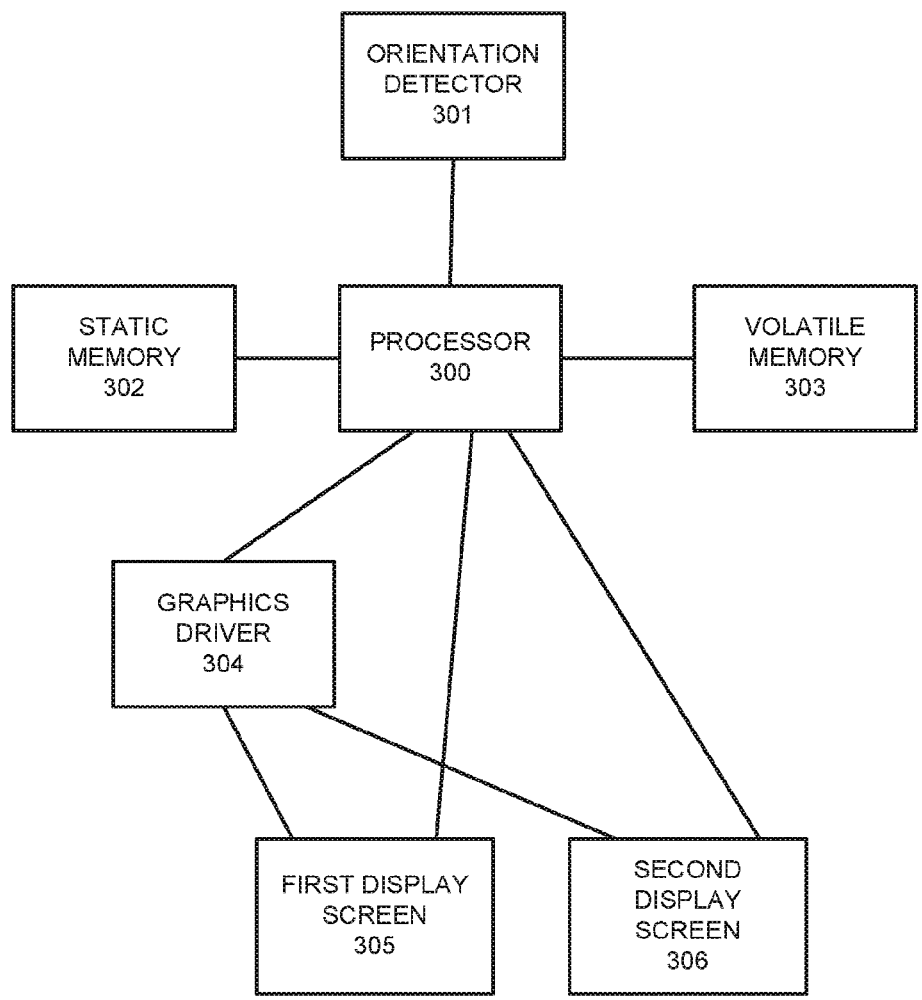
FIG. 44 is a schematic diagram illustrating the electronic components of an example display unit.

FIG. 44 is a schematic diagram illustrating the electronic components of an example display unit used in the example described above with reference to FIGS. 40 to 42.

A processor 300 is connected to static memory 302 storing code used by the processor such as operating system code and for the storage of data in a non-volatile manner. Volatile memory 303 is provided for the storage of application code and data and information for display. An orientation detector 301 is provided to detect a change in orientation of the display unit to detect when the display unit is turned and optionally the direction of turning to enable both incremental and decremental changes in the displayed information parts. A graphics driver 304 is provided for the control of two display screens 305 and 306, which can be touch sensitive display screens to provide user input responsive to the displayed information.

The double sided display unit of this embodiment can be used as the display unit of any previously described embodiment.

Figure 45:
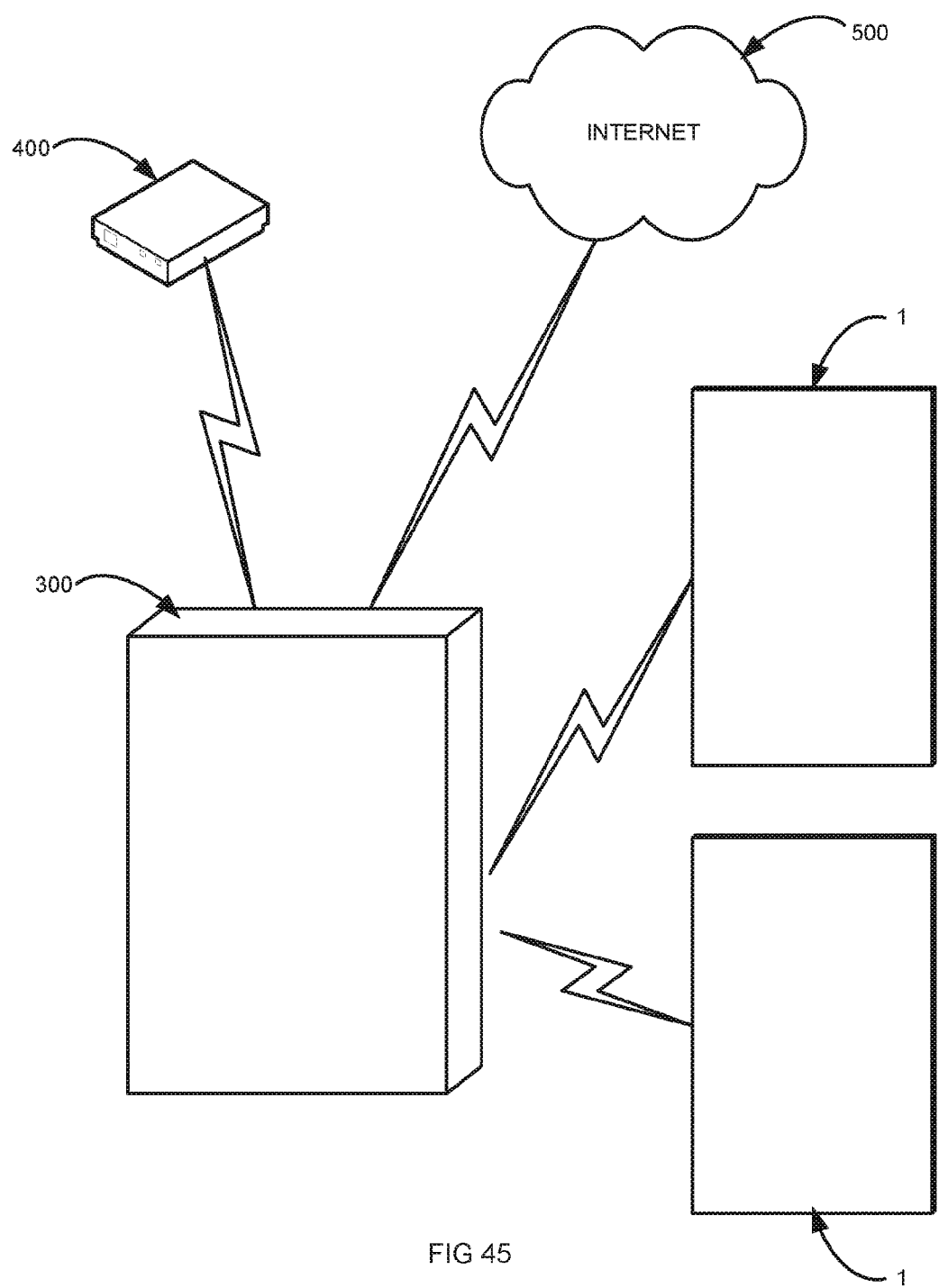
FIG. 45 is a schematic diagram illustrating the communication of information by example electronic display apparatus.

FIG. 45 is a schematic diagram illustrating the communication of information by an example electronic display apparatus.

This diagram illustrates the configuration of the display apparatus during communications with a communications network, such as the internet or a local network. This is applicable to the display apparatuses of any example described above. One or more display units 1 (two display units 1 in this examples), communicate with the mount unit 300 using a low power and short-range communication protocol, such as Bluetooth™. The range can be limited to less than 10 m. The mount unit 300 can communicate using longer range and higher power communication protocols, such as GSM or GPRS over a cellular network to the internet 500 or using WIFI to a router 400 for connection to a computer network, which could be the internet 500.

The use of the high power and longer-range transmissions to and from the mount unit enables multiple display units to use the same communication link and for the display units to use lower power and shorter-range links to the mount unit to reduce the power consumption requirements of the display units 1.

In any of the examples described above, the display units can be flexible e.g. OLED or flexible LED displays or rigid displays e.g. LED displays or a mix of flexible and rigid displays. Any of the display units can be touch sensitive to provide a means by which a user can provide an input for processing by the processor of the display unit (possibly in conjunction with the processor of the mount unit).

Although the figures and accompanying description illustrate and describe portable apparatus, on other examples, the mount device could be fixed to or part of a fixed or non-portable device, such as a larger or desktop computer, a machine, such as a CNC machine or even inbuilt into a vehicle, such as a car or airplane so that the mount unit is fixed, and the display units are removeable for use. For example, passengers or a driver or pilot could be able to take out a display unit from the mount unit is a vehicle for interaction with the display unit. Passengers could use the or each display unit for entertainment purposes, while a driver or pilot could use the or each display unit for vehicle control or monitoring purposes. In such fixed configurations, communications from the mount unit to a communications network can be wired or wireless. If wireless, the wireless transceiver can be of higher power and range compared with the transceiver used for communication between the or each display unit and the mount unit.

The mount unit or frame may be portable but may also be useable with or part of a fixed device so as to be separable from and replaceable the fixed device so that the portable display apparatus can work with the fixed device as part of it and then detached for ease of portability.

In a fixed configuration to which the mount is fixed or is a part of, the apparatus could include one or more other fixed display displays.

In any of the examples described, each display unit is capable of independent operation and hence multiple display units could be used by multiple people. Hence, a mount unit containing multiple display units can provide display units that can be removed from the mount unit and used by multiple people independently or in a networked cooperative operation. Display units have their own memory and processor and hence can store and process information and data separately and independently. Also, display units can share stored information and data. Also, display units can share information with an external processor, such as a PC on which the mount is fixed, or a processor remotely connected on the network.

The display units in the examples can be used like tablet computing devices, separate from the mount unit. The display units can act like networked computer devices and they can connect over the low powered shorter range communication link through the hub to other devices connected to a computer/communication network.

In the above examples, the display units have been described as being capable of being charged when they are mounted to the mount unit. In another example, the display units can also be charged independently of the mount. For example, if the display units are charged wirelessly when in the mount, they could also be wirelessly charged by a separately wireless charging pad away from the mount unit. If a physical connection is used for charging the wireless unit, in one example a separate charging apparatus with the required mating physical connection can be provided for charging the display units away from the mount unit.

In any of the examples above, if the display unit has a screen on both sides, it can be turned over to view information on both sides. Similarly, if a mount unit can hold a display unit on both sides with their screens visible, the mount can be turned over to view information on both sides as for example described with reference to FIGS. 39 to 41.

The mount unit provides a structure for the safe keeping and physical protection of the or each display units, particularly when the display units are inserted into the mount unit to be contained within the mount unit.

The display units can include a camera commonly known as a web cam to provide a video capability and one or more loudspeakers for audio output and one or more microphones for audio input.

In any of the embodiments described, the display units can be used when separated from the mount unit or display frame structure. The display units may also be used when in the mount unit or in the display frame structure. In any embodiment of the mount unit, at least one display unit can be mount to a frame before being mounted into the mount unit.

In the embodiments of FIGS. 1 to 36, 39 to 43 and 45 the display unit is show as a simplified schematic of the form of a rectangular unit. The display unit can take any form in which the display part may comprise the whole of a front or a front and rear face or the display part may be surrounded by a frame. The display units can be of a rigid, flexible, malleable or foldable form or, where a plurality is used, of a mixture of rigid, flexible, malleable, foldable and rigid display units.

In any of the previously described embodiments, the mount unit, frames or display units can be rigid, foldable, flexible or malleable.

In the embodiments above the display unit or units can include a keyboard for example or other component that is foldable to fold onto the display screen so that the display unit with keyboard or other folded component can be inserted into the mount unit.

Generalized Embodiments

The following numbered examples are embodiments.

1. Display apparatus comprising a plurality of display units each hingedly linked together to form a foldable display structure, each display unit comprising a display screen with user input capability, a battery, and a wireless transceiver; and a mount unit adapted to receive and hold the display units when folded within the mount unit, the mount unit further comprising a power arrangement configured to recharge the battery of the display units when the display units are received and held within the mount unit, a first wireless transceiver for communication with the wireless transceiver of each of the display units, and a communication arrangement for communication over a communications network; wherein the display units are removeable from within the mount unit for use separated from the mount unit.

2. Display apparatus according to example 1, wherein the first wireless transceiver of the mount unit and the wireless transceiver of each display unit are short range wireless transceivers.

3. Display apparatus according to example 1 or example 2, wherein the communication arrangement comprises a second wireless transceiver for wireless communication, and the first wireless transceiver of the mount unit and the wireless transceiver of each display unit are of a shorter range than the second wireless transceiver 4. Display apparatus according to any preceding example, wherein the display screen with user input capability comprises a touch sensitive display.

5. Display apparatus according to any preceding example, including at least three display units hingedly linked together, and the display units are foldable in a stacked arrangement.

6. Display apparatus according to example 5, wherein the display units are foldable in an alternating folded arrangement.

7. Display apparatus according to any preceding example, wherein the display units are detachably linked together.

8. Display apparatus according to any preceding example, wherein the mount unit includes a slot along a side thereof to receive and hold the display units to be contained within the mount unit.

9. Display apparatus according to any preceding example, wherein the display apparatus is portable and hand held.

10. Display apparatus according to any preceding example, wherein at least one of the display units is a flexible display unit and the mount unit is rigid to rigidly support the at least one flexible display unit when received and held within the mount unit.

11. Display apparatus according to example 11, wherein at least one of the display units includes the battery, first wireless transceiver, a display processor, and other electronics in a rigid configuration along one edge of the display unit.

12. Display apparatus according to any one of examples 1 to 9, including a display frame structure for receiving and supporting at least peripheral portions of at least one of the display units, the display frame structure being configured to be hingedly connected together and/or to at least one other said display unit.

13. Display apparatus comprising at least one display unit, the or each display unit comprising a display screen with user input capability, a battery, and a wireless transceiver; a display frame structure for receiving and supporting at least peripheral portions of the or each display unit; and a mount unit adapted to receive and hold the display frame structure within the mount unit, the mount unit further comprising a power arrangement configured to recharge the battery of the or each display unit when the display units are received within the mount unit, a first wireless transceiver for communication with the wireless transceiver of the or each display unit, and a communication arrangement for communication over a communications network; wherein the or each display unit is removeable from the mount unit for use separated from the mount unit.

14. Display apparatus according to example 13, wherein the first wireless transceiver of the mount unit and the wireless transceiver of the or each display unit are short range wireless transceivers.

15. Display apparatus according to example 13 or example 14, wherein the communication arrangement comprises a second wireless transceiver for wireless communication, and the first wireless transceiver of the mount unit and the wireless transceiver of the or each display unit are of a shorter range than the second wireless transceiver 16. Display apparatus according to any one of examples 13 to 15, wherein the display frame structure comprises a plurality of frames, each frame for receiving and supporting a said display unit and being hingedly linked together to form a foldable frame structure.

17. Display apparatus according to example 16, including at least three display frames hingedly linked together, and the frames are foldable in a stacked arrangement for being received and held within the mount unit.

18. Display apparatus according to example 17, wherein the frames are foldable in an alternating folded arrangement.

19. Display apparatus according to any one of examples 16 to 18, wherein the frames are detachably linked together.

20. Display apparatus according to any one of examples 13 to 19, wherein said mount unit includes a slot along a side thereof to receive and hold the display frame structure within the mount unit.

21. Display apparatus according to any one of examples 13 to 20, wherein the display frame structure includes an adjustable mounting arrangement, wherein the adjustable mounting arrangement is adjustable to fit at least one different sized display unit therein.

22. Display apparatus according to any one of examples 13 to 21, wherein at least one of the at least one display units is a flexible display and the display frame structure supports the flexible display to maintain a flat shape.

23. Display apparatus comprising a plurality of display units, each display unit comprising a display screen with user input capability, a battery, and a wireless transceiver; and a mount unit comprising a display frame structure for receiving and supporting at least peripheral portions of each of the display units, the mount unit further comprising a power arrangement configured to recharge the battery of the display units when the display units are received by the mount unit, a first wireless transceiver for communication with the wireless transceiver of the display units, and a communication arrangement for communication over a communications network; wherein the display units are removeable from the mount unit for use separated from the mount unit.

24. Display apparatus according to example 23, wherein the first wireless transceiver of the mount unit and the wireless transceiver of each display unit are short range wireless transceivers.

25. Display apparatus according to example 23 or example 24, wherein the communication arrangement comprises a second wireless transceiver for wireless communication, and the first wireless transceiver of the mount unit and the wireless transceiver of each display unit are of a shorter range than the second wireless transceiver 26. Display apparatus according to any one of examples 23 to 25, wherein the display frame structure comprises a plurality of frames, each frame for receiving and supporting a display unit and being hingedly linked together to form a foldable frame structure.

27. Display apparatus according to example 26, including at least three display frames hingedly linked together, and the frames are foldable in a stacked arrangement.

28. Display apparatus according to example 27, wherein the frames are foldable in an alternating folded arrangement.

29. Display apparatus according to any one of examples 26 to 28, wherein the frames are detachably linked together.

30. Display apparatus according to any one of examples 23 to 29, wherein the display frame structure includes an adjustable mounting arrangement, wherein the adjustable mounting arrangement is adjustable to fit different sized display units therein.

31. Display apparatus according to any one of examples 23 to 30, wherein at least one of the display units is a flexible display and the display frame structure supports the flexible display to maintain a flat shape.

32. Display apparatus comprising a plurality of display units, each display unit comprising a display screen with user input capability, a battery, and a wireless transceiver; and a mount unit comprising a hinge region and a plurality of frames hingedly connected to the hinge region, each frame configured to receive and hold a display unit, the mount unit further comprising a power arrangement configured to recharge the battery of the display units when the display units are received by the mount unit, a first wireless transceiver for communication with the wireless transceiver of the display units, and a communication arrangement for communication over a communications network; wherein the display units are removeable from the mount unit for use separated from the mount unit.

33. Display apparatus according to example 32, wherein the first wireless transceiver of the mount unit and the wireless transceiver of each display unit are short range wireless transceivers.

34. Display apparatus according to example 32 or example 33, wherein the communication arrangement comprises a second wireless transceiver for wireless communication, and the first wireless transceiver of the mount unit and the wireless transceiver of each display unit are of a shorter range than the second wireless transceiver 35. Display apparatus according to any one of examples 32 to 34, wherein at least one of the plurality of frames is adjustable to fit different sized display units therein.

36. Display apparatus according to any one of examples 32 to 35, wherein at least one of the display units is a flexible display and at least one of the frames supports the flexible display to maintain a flat shape.

37. Display apparatus according to any one of examples 32 to 36, wherein at least one of the frames is detachable from the hinge region.

38. Display apparatus comprising at least one display unit, the or each display unit comprising a display screen with user input capability, a battery, and a wireless transceiver; and a mount unit to receive and hold the or each display unit contained within the mount unit, the mount unit further comprising a power arrangement configured to recharge the battery of the or each display unit when the at least one display unit is received and held contained within the mount unit, a first wireless transceiver for communication with the wireless transceiver of each of the at least one display unit, and a communication arrangement for communication over a communications network; wherein the at least one display unit is removeable from within the mount unit for use separated from the mount unit.

39. Display apparatus according to example 38, wherein the mount unit includes at least one slot along a side thereof for the insertion of the or each display unit into the mount unit.

40. Display apparatus according to example 38, wherein the mount unit comprises a first part and a second part, the first and second part being separable for the insertion of the or each display unit into the mount unit.

41. Display apparatus according to any one of examples 38 to 40, wherein the first wireless transceiver of the mount unit and the wireless transceiver of the or each display unit are short range wireless transceivers.

42. Display apparatus according to any one of examples 38 to 41, wherein the communication arrangement comprises a second wireless transceiver for wireless communication, and the first wireless transceiver of the mount unit and the wireless transceiver of the or each display unit are of a shorter range than the second wireless transceiver 43. Display apparatus according to any one of examples 38 to 42, wherein the display apparatus is portable and hand held.

44. Display apparatus according to any one of examples 38 to 43, wherein the mount unit includes an eject mechanism to eject the at least one display unit contained therein.

45. Display apparatus according to any one of examples 38 to 44, including a display frame structure for receiving and supporting at least peripheral portions of at least one of the at least one display units.

46. Display apparatus according to example 45, wherein the display frame structure comprises at least one frame, the or each frame for supporting a respective display unit.

47. Display apparatus according to example 45 or example 46, wherein the display frame structure includes an adjustable mounting arrangement, wherein the adjustable mounting arrangement is adjustable to fit different sized display units therein.

48. Display apparatus according to claim 46 or claim 47, wherein at least one of the at least one display units is a flexible display and at least one of the at least one frames supports the respective flexible display to maintain a flat shape.

49. Display apparatus comprising a plurality of display units, each display unit comprising a detector arrangement to detect when at least one other display is arranged adjacently, a wireless transceiver to communicate display synchronization information to at least one adjacent display unit, and a display controller configured to control the display unit to display information comprising a sequence of information parts so that adjacent display units display information parts as a sequence of information parts.

50. Display apparatus according to example 49, wherein the detector arrangement of each display unit is configured to detect when an adjacent display unit is adjacently repositioned relative to the display unit, and the display controller is configured to control the display unit to display an information part so that adjacent display units display the information as an incremented or decremented sequence of information parts.

51. Display apparatus according to example 49 or example 50, comprising two display units.

52. Display apparatus according to any one of examples 49 to 51, wherein the display units lie side by side and when a first display unit is move from one side of a second display unit to an opposed side of the second display unit the display controller of the first display unit is configured to control the first display unit to change the displayed information part from an information part preceding an information part displayed by the second display unit to an information part succeeding an information part displayed by the second display unit.

53. Display apparatus according to any one of examples 47 to 50, wherein the display units lie side by side and when a first display unit is move from one side of a second display unit to an opposed side of the second display unit the display controller of the second display unit is configured to control the second display unit to increment the displayed information part in the sequence and the display controller of the first display unit is configured to control the first display unit to change the displayed information part to an information part succeeding the incremented information part displayed by the second display unit.

54. Display apparatus according to any one of examples 49 to 51, wherein at least one of the display units is double sided and is configured to display information on an upward facing face of either of opposed faces of the double-sided display unit, the at least one of the display units includes a detection arrangement to detect when the face of the display unit facing upwards changes, and the display controller of the at least one double sided display unit is configured to control the double-sided display unit to display an incremented or decremented information part in response to a detection of by the detection arrangement.

55. Display apparatus according to example 54, wherein the display units lie side by side and when a second double sided display unit is move from one side of a first display unit to an opposed side of the first display unit and turned over, the display controller of the second display unit is configured to control the second display unit to display on the upward facing face an information part succeeding an information part that was displayed on the other face, and the display controller of the first display unit is configured to change the displayed information part from an information part preceding an information part displayed by the second display unit to an information part succeeding an information part now displayed by the second display unit.

56. Display apparatus according to any one of examples 49 to 55, wherein display controller is configured to control the display unit to display sequential pages of information on adjacent display units.

57. A display unit comprising a first display on a first face; a second display on a second face; a detection arrangement to detect when the display unit is turned to change the first display or the second display to face upwards; and a display controller to control the first and second display to display on one of the first or second displays a first information part of a sequence of information parts when the first display or second display is facing upwards, and to display on the other of the first and second displays a second information part incremented or decremented relative to the first information part in response to a detection by the detection arrangement.

58. A display unit according to example 57, wherein the detection unit is configured to detect the direction of turning of the display unit, and the display controller is configured to display the second part incremented when the detection unit detects turning in a first direction and to display the second part decremented when the detection unit detects turning in a second direction.

59. A display unit according to example 58, wherein the first and second directions are opposite directions.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. Display apparatus comprising:
a plurality of display units, each display unit comprising:
 a detector arrangement to detect when at least one other display is arranged adjacently,
 a wireless transceiver to communicate display synchronization information to at least one adjacent display unit, and
 a display controller configured to control the display unit to display information comprising a sequence of information parts so that adjacent display units display information parts as a sequence of information parts.

2. Display apparatus according to claim 1, wherein the detector arrangement of each display unit is configured to detect when an adjacent display unit is adjacently repositioned relative to the display unit, and the display controller is configured to control the display unit to display an information part so that adjacent display units display the information as an incremented or decremented sequence of information parts.

3. Display apparatus according to claim 1, comprising two display units.

4. Display apparatus according to claim 1, wherein the display units lie side by side and when a first display unit is move from one side of a second display unit to an opposed side of the second display unit the display controller of the first display unit is configured to control the first display unit to change the displayed information part from an information part preceding an information part displayed by the second display unit to an information part succeeding an information part displayed by the second display unit.

5. Display apparatus according to claim 1, wherein the display units lie side by side and when a first display unit is move from one side of a second display unit to an opposed side of the second display unit the display controller of the second display unit is configured to control the second display unit to increment the displayed information part in the sequence and the display controller of the first display unit is configured to control the first display unit to change the displayed information part to an information part succeeding the incremented information part displayed by the second display unit.

6. Display apparatus according to claim 1, wherein
 at least one of the display units is double sided and is configured to display information on an upward facing face of either of opposed faces of the double-sided display unit,
 the at least one of the display units includes a detection arrangement to detect when the face of the display unit facing upwards changes, and
 the display controller of the at least one double sided display unit is configured to control the double-sided display unit to display an incremented or decremented information part in response to a detection of by the detection arrangement.

7. Display apparatus according to claim 6, wherein the display units lie side by side and when a second double sided display unit is move from one side of a first display unit to an opposed side of the first display unit and turned over, the display controller of the second display unit is configured to control the second display unit to display on the upward facing face an information part succeeding an information part that was displayed on the other face, and the display controller of the first display unit is configured to change the displayed information part from an information part preceding an information part displayed by the second display unit to an information part succeeding an information part now displayed by the second display unit.

8. Display apparatus according to claim 6, wherein display controller is configured to control the display unit to display sequential pages of information on adjacent display units.

* * * * *